(12) United States Patent
Huang et al.

(10) Patent No.: US 11,089,325 B2
(45) Date of Patent: Aug. 10, 2021

(54) CONSTRAINED AFFINE MOTION INHERITANCE FOR VIDEO CODING

(71) Applicant: QUALCOMM Incorporated, San Diego, CA (US)

(72) Inventors: Han Huang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/783,697

(22) Filed: Feb. 6, 2020

(65) Prior Publication Data

US 2020/0260106 A1     Aug. 13, 2020

Related U.S. Application Data

(60) Provisional application No. 62/803,236, filed on Feb. 8, 2019.

(51) Int. Cl.
*H04N 19/52* (2014.01)
*H04N 19/176* (2014.01)
*H04N 19/55* (2014.01)

(52) U.S. Cl.
CPC .......... *H04N 19/52* (2014.11); *H04N 19/176* (2014.11); *H04N 19/55* (2014.11)

(58) Field of Classification Search
CPC ...... H04N 19/52; H04N 19/176; H04N 19/55; H04N 19/70; H04N 19/513
See application file for complete search history.

(56) References Cited

U.S. PATENT DOCUMENTS

| | | | | |
|---|---|---|---|---|
| 5,905,542 A | * | 5/1999 | Linzer | H04N 19/51 348/699 |
| 2018/0098063 A1 | | 4/2018 | Chen et al. | |
| 2019/0124332 A1 | * | 4/2019 | Lim | H04N 19/137 |
| 2020/0014931 A1 | * | 1/2020 | Hsiao | H04N 19/139 |
| 2020/0154126 A1 | * | 5/2020 | Li | H04N 19/109 |

OTHER PUBLICATIONS

Bossen F., et al., "JVET Common Test Conditions and Software Reference Configurations for SDR video", Joint Video Experts Team (JVET) of ITU-T SG 16 WP 3 and ISO/IEC JTC 1/SC 29/WG 11, Document: JVET-M1010-V1, 13th Meeting: Marrakech, MA, Jan. 9-18, 2019, pp. 1-6.

(Continued)

*Primary Examiner* — Tracy Y. Li
(74) *Attorney, Agent, or Firm* — Shumaker & Sieffert, P.A.

(57) ABSTRACT

An example device for coding video data may include a memory configured to store a current block of the video data and one or more processors implemented in circuitry coupled to the memory. The one or more processor may be configured to determine delta motion vectors from control point motion vectors of a neighboring block of a current block. The one or more processors may also be configured to clip the delta motion vectors to a predefined range. The one or more processors may also be configured to code the current block of video data using the clipped delta motion vectors.

31 Claims, 11 Drawing Sheets

(56) References Cited

OTHER PUBLICATIONS

Chen (Interdigital) W., et al., "CE4-Related: Clipping for PROF", 16. JVET Meeting, Oct. 1, 2019-Oct. 11, 2019, Geneva, (The Joint Video Exploration Team of ISO/IEC JTC1/SC29/WG11 and ITU-T SG.16), No. JVET-P0413, Sep. 25, 2019 (Sep. 25, 2019), XP030217241, 2 Pages, Retrieved from the Internet: URL: http://phenix.int-evry.fr/jvet/doc_end_user/documents/16_Geneva/wg11/JVET-P0413-v1.zip JVET-P0413-test2-WD.docx, [retrieved on Sep. 25, 2019], the whole document.

Goudie A., "Restrictions to the Maximum Motion Vector Range", 101. MPEG 10th Meeting, Jul. 16, 2012-Jul. 20, 2012, Stockholm, Joint Collaborative Team on Video Coding (JCT-VC) of ITU-T SG 16 WP 3, (Motion Picture Expert Group or ISO/IEC JTC1/SC29/WG11), No. m25551, Jul. 12, 2012 (Jul. 12, 2012), XP030053885, 10 pages, p. 1-p. 2.

Hanhart (Interdigital) P., et al., "Non-CE2: Motion Vector Clipping in Affine Sub-Block Motion Vector Derivation", 125. MPEG Meeting, Joint Video Expert Team (JVET), Jan. 14, 2019-Jan. 18, 2019, Marrakech, (Motion Picture Expert Group or ISO/IEC JTC1/SC29/WG11), No. m45409, Jan. 26, 2019 (Jan. 26, 2019), XP030213186, 3 pages, Retrieved from the Internet: URL: http://phenix.int-evry.fr/mpeg/doc_end_user/documents/125_Marrakech/wg11/m45409-JVET-M0145-v4-JVET-M0145-v4.zip, JVET-M0145-v1.docx, [retrieved on Jan. 26, 2019], the whole document.

Huang H., et al., "CE2: Alignment of Affine Control-point Motion Vector and Subblock Motion Vector (Test 2-5.2)", JVET-N0257, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-10.

International Search Report and Written Opinion—PCT/US2020/017201—ISAEPO—dated May 25, 2020.

Zhang K., et al, "CE2-related: An Alternative Storing Method for Affine Inheritance", Joint Video Experts Team (JVET) of ITU-TSG 16 WP 3 and ISO/IEC JTC 1/SC 29/WG 11, 13th Meeting: Marrakech, MA, Jan. 9-18, 2019, Document: JVET-M0270, pp. 1-5.

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pp.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V7, 299 Pages.

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.

Ergen S., "ZigBee/IEEE 802.15.4 Summary", Sep. 10, 2004, 37 Pages.

Huang H., et al., "CE2-Related: Remove above-left Affine Inherited Motion Vector Predictor", Joint Video Experts Team (JVET) of ITU-T SG 16 WP 3 and ISO/IEC JTC 1/SC 29/WG 11, JVET-N0268-V4, 14th Meeting: Geneva, CH, Mar. 19-27, 2019, JVET-N0268, pp. 1-4.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

ITU-T H.223, Series H: Audiovisual and Multimedia Systems "Multiplexing Protocol for Low Bit Rate Multimedia Communication," Jul. 2001, pp. 1-74.

ITU-T H.265, "Series H: Audiovisual and Multimedia Systems, Infrastructure of audiovisual services—Coding of moving video, High efficiency video coding," The International Telecommunication Union. Dec. 2016, 664 Pages.

Zhang K., et al., "CE2-5.4: Parameter-Based Affine Model Inheritance", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0272-V1, pp. 1-2.

Zhou M., et al., "CE4-Related: A Clean up for Affine Mode", Joint Video Experts Team (JVET) of ITU-T SG 16 WP 3 and ISO/IEC JTC 1/SC 29/WG 11, JVET- L0047-V1, 12th Meeting: Macao, CN, Oct. 3-12, 2018, pp. 1-9.

* cited by examiner

US 11,089,325 B2

CONSTRAINED AFFINE MOTION INHERITANCE FOR VIDEO CODING

This application claims the benefit of U.S. Provisional Application No. 62/803,236 filed Feb. 8, 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter prediction in video codecs. More specifically, this disclosure describes methods and devices for performing techniques related to affine motion prediction, including constrained affine motion inheritance. With affine motion inheritance, a current block of video data may inherit two or more motion vectors that represent non-translational motion, such as zoom in or out, rotation, perspective motion, or other irregular motion types, from a neighboring block of video data.

In one example, a method includes determining delta motion vectors from control point motion vectors of a neighboring block of a current block of video data, clipping the delta motion vectors to a predefined range, and coding the current block of video data using the clipped delta motion vectors.

In another example, a device includes a memory and one or more processors implemented in circuitry coupled to the memory, the one or more processors configured to determine delta motion vectors from control point motion vectors of a neighboring block of a current block of video data, clip the delta motion vectors to a predefined range, and code the current block of video data using the clipped delta motion vectors.

In another example, a device includes means for determining delta motion vectors from control point motion vectors of a neighboring block of a current block of video data, means for clipping the delta motion vectors to a predefined range, and means for coding the current block of video data using the clipped delta motion vectors.

In another example, a non-transitory computer-readable storage medium is encoded with instructions that, when executed, cause a programmable processor to determine delta motion vectors from control point motion vectors of a neighboring block of a current block of video data, clip the delta motion vectors to a predefined range, and code the current block of video data using the clipped delta motion vectors.

The details of one or more examples are set forth in the accompanying drawings and the description below. Other features, objects, and advantages will be apparent from the description, drawings, and claims.

DETAILED DESCRIPTION

Figure 1:
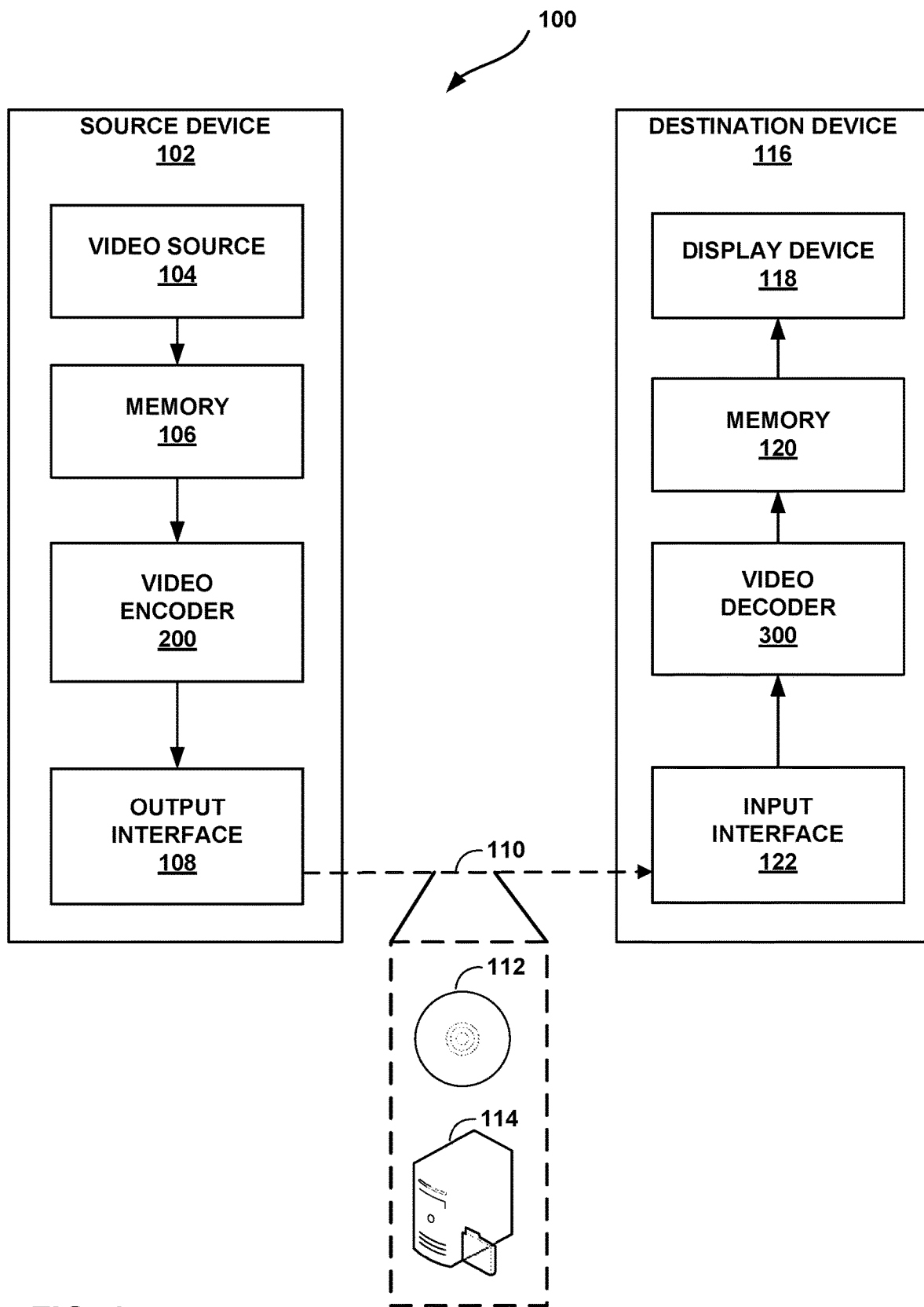
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, the system 100 includes a source device 102 that provides encoded video data to be decoded and displayed by a destination device 116, in this example.

In particular, the source device 102 provides the video data to the destination device 116 via a computer-readable medium 110. The source device 102 and the destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, the source device 102 and the destination device 116 may be equipped for wireless communication, and thus may be referred to as wireless communication devices.

In the example of FIG. 1, the source device 102 includes video source 104, memory 106, video encoder 200, and output interface 108. The destination device 116 includes input interface 122, video decoder 300, memory 120, and display device 118. In accordance with this disclosure, the video encoder 200 of the source device 102 and the video decoder 300 of the destination device 116 may be configured to apply the techniques for constrained affine motion inheritance. Thus, the source device 102 represents an example of a video encoding device, while the destination device 116 represents an example of a video decoding device. In other examples, a source device and a destination device may include other components or arrangements. For example, the source device 102 may receive video data from an external video source, such as an external camera. Likewise, the destination device 116 may interface with an external display device, rather than including an integrated display device.

The system 100 as shown in FIG. 1 is merely one example. In general, any digital video encoding and/or decoding device may perform techniques for constrained affine motion inheritance. The source device 102 and the destination device 116 are merely examples of such coding devices in which source device 102 generates coded video data for transmission to the destination device 116. This disclosure refers to a "coding" device as a device that performs coding (encoding and/or decoding) of data. Thus, the video encoder 200 and the video decoder 300 represent examples of coding devices, in particular, a video encoder and a video decoder, respectively. In some examples, the source device 102 and the destination device 116 may operate in a substantially symmetrical manner such that each of the source device 102 and the destination device 116 include video encoding and decoding components. Hence, the system 100 may support one-way or two-way video transmission between the source device 102 and the destination device 116, e.g., for video streaming, video playback, video broadcasting, or video telephony.

In general, the video source 104 represents a source of video data (i.e., raw, unencoded video data) and provides a sequential series of pictures (also referred to as "frames") of the video data to the video encoder 200, which encodes data for the pictures. The video source 104 of the source device 102 may include a video capture device, such as a video camera, a video archive containing previously captured raw video, and/or a video feed interface to receive video from a video content provider. As a further alternative, the video source 104 may generate computer graphics-based data as the source video, or a combination of live video, archived video, and computer-generated video. In each case, the video encoder 200 encodes the captured, pre-captured, or computer-generated video data. The video encoder 200 may rearrange the pictures from the received order (sometimes referred to as "display order") into a coding order for coding. The video encoder 200 may generate a bitstream including encoded video data. The source device 102 may then output the encoded video data via output interface 108 onto computer-readable medium 110 for reception and/or retrieval by, e.g., input interface 122 of the destination device 116.

Memory 106 of the source device 102 and memory 120 of the destination device 116 represent general purpose memories. In some example, the memory 106 and the memory 120 may store raw video data, e.g., raw video from the video source 104 and raw, decoded video data from the video decoder 300. Additionally or alternatively, the memory 106 and the memory 120 may store software instructions executable by, e.g., the video encoder 200 and the video decoder 300, respectively. Although shown separately from the video encoder 200 and the video decoder 300 in this example, it should be understood that the video encoder 200 and the video decoder 300 may also include internal memories for functionally similar or equivalent purposes. Furthermore, the memory 106 and the memory 120 may store encoded video data, e.g., output from the video encoder 200 and input to the video decoder 300. In some examples, portions of the memory 106 and the memory 120 may be allocated as one or more video buffers, e.g., to store raw, decoded, and/or encoded video data.

Computer-readable medium 110 may represent any type of medium or device capable of transporting the encoded video data from the source device 102 to the destination device 116. In one example, computer-readable medium 110 represents a communication medium to enable the source device 102 to transmit encoded video data directly to the destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 102 to the destination device 116.

In some examples, the source device 102 may output encoded data from the output interface 108 to storage device 112. Similarly, the destination device 116 may access encoded data from the storage device 112 via the input interface 122. The storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, the source device 102 may output encoded video data to file server 114 or another intermediate storage device that may store the encoded video generated by the source device 102. The destination device 116 may access stored video data from the file server 114 via streaming or download. The file server 114 may be any type of server device capable of storing encoded video data and transmitting that encoded video data to the destination device 116. The file server 114 may represent a web server (e.g., for a website), a File Transfer Protocol (FTP) server, a content delivery network device, or a network attached storage (NAS) device. The destination device 116 may access encoded video data from the file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on the file server 114. The file server 114 and the input interface 122 may be configured to operate according to a streaming transmission protocol, a download transmission protocol, or a combination thereof.

The output interface 108 and the input interface 122 may represent wireless transmitters/receiver, modems, wired networking components (e.g., Ethernet cards), wireless communication components that operate according to any of a variety of IEEE 802.11 standards, or other physical components. In examples where the output interface 108 and the input interface 122 comprise wireless components, the output interface 108 and the input interface 122 may be configured to transfer data, such as encoded video data, according to a cellular communication standard, such as 4G, 4G-LTE (Long-Term Evolution), LTE Advanced, 5G, or the like. In some examples where the output interface 108 comprises a wireless transmitter, the output interface 108 and the input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, the source device 102 and/or the destination device 116 may include respective system-on-a-chip (SoC) devices. For example, the source device 102 may include an SoC device to perform the functionality attributed to the video encoder 200 and/or the output interface 108, and the destination device 116 may include an SoC device to perform the functionality attributed to the video decoder 300 and/or the input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

The input interface 122 of the destination device 116 may receive an encoded video bitstream from the computer-readable medium 110 (e.g., the storage device 112, the file server 114, or the like). The encoded video bitstream from the computer-readable medium 110 may include signaling information defined by the video encoder 200, which is also used by the video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. The display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, the video encoder 200 and the video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

The video encoder 200 and the video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 200 and the video decoder 300 may be included in one or more encoders or decoders, either of which may be integrated as part of a combined encoder/decoder (CODEC) in a respective device. A device including the video encoder 200 and/or the video decoder 300 may comprise an integrated circuit, a microprocessor, and/or a wireless communication device, such as a cellular telephone.

The video encoder 200 and the video decoder 300 may operate according to a video coding standard, such as ITU-T H.265, also referred to as High Efficiency Video Coding (HEVC) or extensions thereto, such as the multi-view and/or scalable video coding extensions. Alternatively, the video encoder 200 and the video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 3)," Joint Video Experts Team (WET) of ITU-T SG 16 WP 3 and ISO/IEC JTC 1/SC 29/WG 11, $12^{th}$ Meeting: Macao, CN, 3-12 Oct. 2018, JVET-L1001-v9 (hereinafter "VVC Draft 3). The techniques of this disclosure, however, are not limited to any particular coding standard.

In general, the video encoder 200 and the video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, the video encoder 200 and the video decoder 300 may code video data represented in a YUV (e.g., Y, Cb, Cr) format. That is, rather than coding red, green, and blue (RGB) data for samples of a picture, the video encoder 200 and the video decoder 300 may code luminance and chrominance components, where the chrominance components may include both red hue and blue hue chrominance components. In some examples, the video encoder 200 converts received RGB formatted data to a YUV representation prior to encoding, and the video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as the video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, the video encoder 200 and the video decoder 300 may be configured to operate according to JEM or VVC. According to JEM or VVC, a video coder (such as the video encoder 200) partitions a picture into a CTUs. The video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, the video encoder 200 and the video decoder 300 may use a single QTBT or MTT structure to represent each of the luminance and chrominance components, while in other examples, the video encoder 200 and the video decoder 300 may use two or more QTBT or MTT structures, such as one QTBT/MTT structure for the luminance component and another QTBT/MTT structure for both chrominance components (or two QTBT/MTT structures for respective chrominance components).

The video encoder 200 and the video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "NxN" and "N by N" interchangeably to refer to the sample dimensions of a block (such as a CU or other video block) in terms of vertical and horizontal dimensions, e.g., 16x16 samples or 16 by 16 samples. In general, a 16x16 CU will have 16 samples in a vertical direction (y=16) and 16 samples in a horizontal direction (x=16). Likewise, an NxN CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise NxM samples, where M is not necessarily equal to N.

The video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, the video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, the video encoder 200 may generate the prediction block using one or more motion vectors. The video encoder 200 may generally perform a motion search to identify a reference block that closely matches the CU, e.g., in terms of differences between the CU and the reference block. The video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, the video encoder 200 may predict the current CU using uni-directional prediction or bi-directional prediction.

Some examples of JEM and VVC also provide an affine motion compensation mode, which may be considered an inter-prediction mode. In affine motion compensation mode, the video encoder 200 may determine two or more motion vectors that represent non-translational motion, such as zoom in or out, rotation, perspective motion, or other irregular motion types.

To perform intra-prediction, the video encoder 200 may select an intra-prediction mode to generate the prediction block. Some examples of JEM and VVC provide sixty-seven intra-prediction modes, including various directional modes, as well as planar mode and DC mode. In general, the video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming the video encoder 200 codes CTUs and CUs in raster scan order (left to right, top to bottom).

The video encoder 200 encodes data representing the prediction mode for a current block. For example, for inter-prediction modes, the video encoder 200 may encode data representing which of the various available inter-prediction modes is used, as well as motion information for the corresponding mode. For uni-directional or bi-directional inter-prediction, for example, the video encoder 200 may encode motion vectors using advanced motion vector prediction (AMVP) or merge mode. The video encoder 200 may use similar modes to encode motion vectors for affine motion compensation mode.

Following prediction, such as intra-prediction or inter-prediction of a block, the video encoder 200 may calculate residual data for the block. The residual data, such as a residual block, represents sample by sample differences between the block and a prediction block for the block, formed using the corresponding prediction mode. The video encoder 200 may apply one or more transforms to the residual block, to produce transformed data in a transform domain instead of the sample domain. For example, the video encoder 200 may apply a discrete cosine transform (DCT), an integer transform, a wavelet transform, or a conceptually similar transform to residual video data. Additionally, the video encoder 200 may apply a secondary transform following the first transform, such as a mode-dependent non-separable secondary transform (MDNSST), a signal dependent transform, a Karhunen-Loeve transform (KLT), or the like. The video encoder 200 produces transform coefficients following application of the one or more transforms.

As noted above, following any transforms to produce transform coefficients, the video encoder 200 may perform quantization of the transform coefficients. Quantization generally refers to a process in which transform coefficients are quantized to possibly reduce the amount of data used to represent the coefficients, providing further compression. By performing the quantization process, the video encoder 200 may reduce the bit depth associated with some or all of the coefficients. For example, the video encoder 200 may round an n-bit value down to an m-bit value during quantization, where n is greater than m. In some examples, to perform quantization, the video encoder 200 may perform a bitwise right-shift of the value to be quantized.

Following quantization, the video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, the video encoder 200 may utilize a predefined scan order to scan the quantized transform coefficients to produce a serialized vector, and then entropy encode the quantized transform coefficients of the vector. In other examples, the video encoder 200 may perform an adaptive scan. After scanning the quantized transform coefficients to form the one-dimensional vector, the video encoder 200 may entropy encode the one-dimensional vector, e.g., according to context-adaptive binary arithmetic coding (CABAC). The video encoder 200 may also entropy encode values for syntax elements describing metadata associated with the encoded video data for use by the video decoder 300 in decoding the video data.

To perform CABAC, the video encoder 200 may assign a context within a context model to a symbol to be transmitted. The context may relate to, for example, whether neighboring values of the symbol are zero-valued or not. The probability determination may be based on a context assigned to the symbol.

The video encoder 200 may further generate syntax data, such as block-based syntax data, picture-based syntax data, and sequence-based syntax data, to the video decoder 300, e.g., in a picture header, a block header, a slice header, or other syntax data, such as a sequence parameter set (SPS), picture parameter set (PPS), or video parameter set (VPS). The video decoder 300 may likewise decode such syntax data to determine how to decode corresponding video data.

In this manner, the video encoder 200 may generate a bitstream including encoded video data, e.g., syntax elements describing partitioning of a picture into blocks (e.g., CUs) and prediction and/or residual information for the blocks. Ultimately, the video decoder 300 may receive the bitstream and decode the encoded video data.

In general, the video decoder 300 performs a reciprocal process to that performed by the video encoder 200 to decode the encoded video data of the bitstream. For example, the video decoder 300 may decode values for syntax elements of the bitstream using CABAC in a manner substantially similar to, albeit reciprocal to, the CABAC encoding process of the video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. The video decoder 300 may inverse quantize and inverse transform the quantized transform coefficients of a block to reproduce a residual block for the block. The video decoder 300 uses a signaled prediction mode (intra- or inter-prediction) and related prediction information (e.g., motion information for inter-prediction) to form a prediction block for the block. The video decoder 300 may then combine the prediction block and the residual block (on a sample-by-sample basis) to reproduce the original block. The video decoder 300 may perform additional processing, such as performing a deblocking process to reduce visual artifacts along boundaries of the block.

In accordance with the techniques of this disclosure, as will be explained in more detail below, the video encoder 200 and the video decoder 300 may be configured to code a block of vide data using an affine coding mode and constrained affine motion inheritance. For example, the video encoder 200 and the video decoder 300 may be configured to determine delta motion vectors from control point motion vectors of a neighboring block of a current block of video data, clip the delta motion vectors to a predefined range, and code the current block of video data using the clipped delta motion vectors.

This disclosure may generally refer to "signaling" certain information, such as syntax elements. The term "signaling" may generally refer to the communication of values syntax elements and/or other data used to decode encoded video data. That is, the video encoder 200 may signal values for syntax elements in the bitstream. In general, signaling refers to generating a value in the bitstream. As noted above, the source device 102 may transport the bitstream to the destination device 116 substantially in real time, or not in real time, such as might occur when storing syntax elements to the storage device 112 for later retrieval by the destination device 116.

Figure 2A:
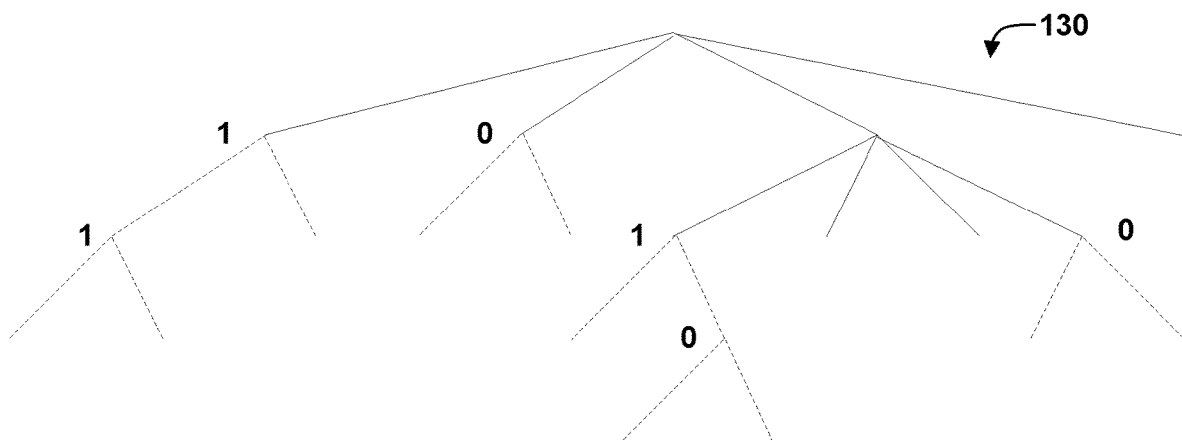
FIGS. 2A and 2B are conceptual diagrams illustrating an example quadtree binary tree (QTBT) structure, and a corresponding coding tree unit (CTU).
Figure 2B:
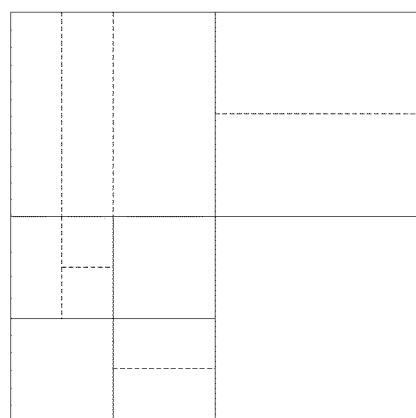

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, the video encoder 200 may encode, and the video decoder 300 may decode, syntax elements (such as splitting information) for a region tree level of the QTBT structure 130 (i.e., the solid lines) and syntax elements (such as splitting information) for a prediction tree level of the QTBT structure 130 (i.e., the dashed lines). The video encoder 200 may encode, and the video decoder 300 may decode, video data, such as prediction and transform data, for CUs represented by terminal leaf nodes of the QTBT structure 130.

In general, the CTU 132 of FIG. 2B may be associated with parameters defining sizes of blocks corresponding to nodes of the QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of the QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of the QTBT structure 130 represents such nodes as having dashed lines for branches. The binary tree leaf node is referred to as a CU, which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
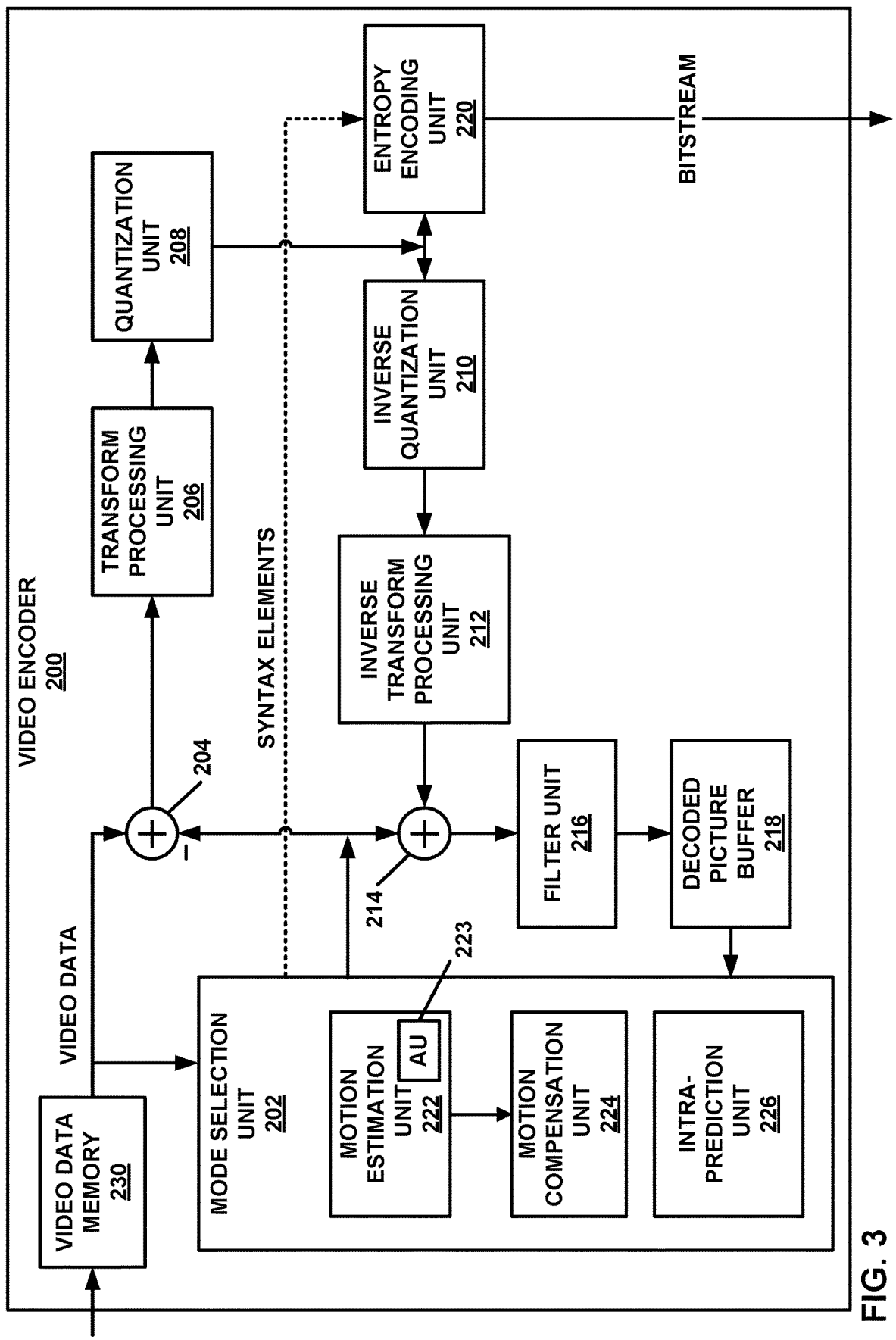
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes the video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, the video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of the video data memory 230, the mode selection unit 202, the residual generation unit 204, the transform processing unit 206, the quantization unit 208, the inverse quantization unit 210, the inverse transform processing unit 212, the reconstruction unit 214, the filter unit 216, the DPB 218, and the entropy encoding unit 220 may be implemented in one or more processors or in processing circuitry. Moreover, the video encoder 200 may include additional or alternative processors or processing circuitry to perform these and other functions.

The video data memory 230 may store video data to be encoded by the components of the video encoder 200. The video encoder 200 may receive the video data stored in the video data memory 230 from, for example, the video source 104 (FIG. 1). The DPB 218 may act as a reference picture memory that stores reference video data for use in prediction of subsequent video data by the video encoder 200. The video data memory 230 and the DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. The video data memory 230 and the DPB 218 may be provided by the same memory device or separate memory devices. In various examples, the video data memory 230 may be on-chip with other components of the video encoder 200, as illustrated, or off-chip relative to those components.

In this disclosure, reference to the video data memory 230 should not be interpreted as being limited to memory internal to the video encoder 200, unless specifically described as such, or memory external to the video encoder 200, unless specifically described as such. Rather, reference to the video data memory 230 should be understood as reference memory that stores video data that the video encoder 200 receives for encoding (e.g., video data for a current block that is to be encoded). The memory 106 of FIG. 1 may also provide temporary storage of outputs from the various units of the video encoder 200.

The various units of FIG. 3 are illustrated to assist with understanding the operations performed by the video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

The video encoder 200 may include arithmetic logic units (ALUs), elementary function units (EFUs), digital circuits, analog circuits, and/or programmable cores, formed from programmable circuits. In examples where the operations of the video encoder 200 are performed using software executed by the programmable circuits, memory 106 (FIG. 1) may store the object code of the software that the video encoder 200 receives and executes, or another memory within the video encoder 200 (not shown) may store such instructions.

The video data memory 230 is configured to store received video data. The video encoder 200 may retrieve a picture of the video data from the video data memory 230 and provide the video data to residual generation unit 204 and mode selection unit 202. Video data in the video data memory 230 may be raw video data that is to be encoded.

The mode selection unit 202 includes a motion estimation unit 222, motion compensation unit 224, and an intra-prediction unit 226. The mode selection unit 202 may include additional functional units to perform video prediction in accordance with other prediction modes. As examples, the mode selection unit 202 may include a palette unit, an intra-block copy unit (which may be part of the motion estimation unit 222 and/or the motion compensation unit 224), an affine unit (AU) 223, a linear model (LM) unit, or the like.

The mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. The mode selection unit 202 may ultimately select the combination of encoding parameters having rate-distortion values that are better than the other tested combinations.

The video encoder 200 may partition a picture retrieved from the video data memory 230 into a series of CTUs, and encapsulate one or more CTUs within a slice. The mode selection unit 202 may partition a CTU of the picture in accordance with a tree structure, such as the QTBT structure or the quad-tree structure of HEVC described above. As described above, the video encoder 200 may form one or more CUs from partitioning a CTU according to the tree structure. Such a CU may also be referred to generally as a "video block" or "block."

In general, the mode selection unit 202 also controls the components thereof (e.g., the motion estimation unit 222, the motion compensation unit 224, and the intra-prediction unit 226) to generate a prediction block for a current block (e.g., a current CU, or in HEVC, the overlapping portion of a PU and a TU). For inter-prediction of a current block, the motion estimation unit 222 may perform a motion search to identify one or more closely matching reference blocks in one or more reference pictures (e.g., one or more previously coded pictures stored in the DPB 218). In particular, the motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. The motion estimation unit 222 may generally perform these calculations using sample-by-sample differences between the current block and the reference block being considered. The motion estimation unit 222 may identify a reference block having a lowest value resulting from these calculations, indicating a reference block that most closely matches the current block.

The motion estimation unit 222 may form one or more motion vectors (MVs) that defines the positions of the reference blocks in the reference pictures relative to the position of the current block in a current picture. The motion estimation unit 222 may then provide the motion vectors to the motion compensation unit 224. For example, for uni-directional inter-prediction, the motion estimation unit 222 may provide a single motion vector, whereas for bi-directional inter-prediction, the motion estimation unit 222 may provide two motion vectors. The motion compensation unit 224 may then generate a prediction block using the motion vectors. For example, the motion compensation unit 224 may retrieve data of the reference block using the motion vector. As another example, if the motion vector has fractional sample precision, the motion compensation unit 224 may interpolate values for the prediction block according to one or more interpolation filters. Moreover, for bi-directional inter-prediction, the motion compensation unit 224 may retrieve data for two reference blocks identified by respective motion vectors and combine the retrieved data, e.g., through sample-by-sample averaging or weighted averaging.

As another example, for intra-prediction, or intra-prediction coding, the intra-prediction unit 226 may generate the prediction block from samples neighboring the current block. For example, for directional modes, the intra-prediction unit 226 may generally mathematically combine values of neighboring samples and populate these calculated values in the defined direction across the current block to produce the prediction block. As another example, for DC mode, the intra-prediction unit 226 may calculate an average of the neighboring samples to the current block and generate the prediction block to include this resulting average for each sample of the prediction block.

The mode selection unit 202 provides the prediction block to the residual generation unit 204. The residual generation unit 204 receives a raw, uncoded version of the current block from the video data memory 230 and the prediction block from the mode selection unit 202. The residual generation unit 204 calculates sample-by-sample differences between the current block and the prediction block. The resulting sample-by-sample differences define a residual block for the current block. In some examples, the residual generation unit 204 may also determine differences between sample values in the residual block to generate a residual block using residual differential pulse code modulation (RDPCM). In some examples, the residual generation unit 204 may be formed using one or more subtractor circuits that perform binary subtraction.

In examples where the mode selection unit 202 partitions CUs into PUs, each PU may be associated with a luma prediction unit and corresponding chroma prediction units. The video encoder 200 and the video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, the video encoder 200 may support PU sizes of 2N×2N or N×N for intra prediction, and symmetric PU sizes of 2N×2N, 2N×N, N×2N, N×N, or similar for inter prediction. The video encoder 200 and the video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and the video decoder 300 may support CU sizes of 2N×2N, 2N×N, or N×2N.

For other video coding techniques such as an intra-block copy mode coding, an affine mode coding, and linear model (LM) mode coding, as few examples, mode selection unit 202, via respective units associated with the coding techniques, generates a prediction block for the current block being encoded. For example, in the case of affine mode coding, the affine unit 223 may determine delta motion vectors from control point motion vectors (CPMVs) of a neighboring block of a current block of video data, scale the delta motion vectors and clip the delta motion vectors when generating a prediction block for the current block of video data being encoded. In some examples, such as palette mode coding, the mode selection unit 202 may not generate a prediction block, and instead generate syntax elements that indicate the manner in which to reconstruct the block based on a selected palette. In such modes, the mode selection unit 202 may provide these syntax elements to the entropy encoding unit 220 to be encoded.

As described above, the residual generation unit 204 receives the video data for the current block and the corresponding prediction block. The residual generation unit 204 then generates a residual block for the current block. To generate the residual block, the residual generation unit 204 calculates sample-by-sample differences between the prediction block and the current block.

The transform processing unit 206 applies one or more transforms to the residual block to generate a block of transform coefficients (referred to herein as a "transform coefficient block"). The transform processing unit 206 may apply various transforms to a residual block to form the transform coefficient block. For example, the transform processing unit 206 may apply a discrete cosine transform (DCT), a directional transform, a Karhunen-Loeve transform (KLT), or a conceptually similar transform to a residual block. In some examples, the transform processing unit 206 may perform multiple transforms to a residual block, e.g., a primary transform and a secondary transform, such as a rotational transform. In some examples, the transform processing unit 206 does not apply transforms to a residual block.

Quantization unit 208 may quantize the transform coefficients in a transform coefficient block, to produce a quantized transform coefficient block. The quantization unit 208 may quantize transform coefficients of a transform coefficient block according to a quantization parameter (QP) value associated with the current block. The video encoder 200 (e.g., via the mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by the transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by the mode selection unit 202. For example, the reconstruction unit 214 may add samples of the reconstructed residual block to corresponding samples from the prediction block generated by the mode selection unit 202 to produce the reconstructed block.

Filter unit 216 may perform one or more filter operations on reconstructed blocks. For example, the filter unit 216 may perform deblocking operations to reduce blockiness artifacts along edges of CUs. Operations of the filter unit 216 may be skipped, in some examples.

The video encoder 200 stores reconstructed blocks in the DPB 218. For instance, in examples where operations of the filter unit 216 are not needed, the reconstruction unit 214 may store reconstructed blocks to the DPB 218. In examples where operations of the filter unit 216 are needed, the filter unit 216 may store the filtered reconstructed blocks to the DPB 218. The motion estimation unit 222 and the motion compensation unit 224 may retrieve a reference picture from the DPB 218, formed from the reconstructed (and potentially filtered) blocks, to inter-predict blocks of subsequently encoded pictures. In addition, the intra-prediction unit 226 may use reconstructed blocks in the DPB 218 of a current picture to intra-predict other blocks in the current picture.

In general, the entropy encoding unit 220 may entropy encode syntax elements received from other functional components of the video encoder 200. For example, the entropy encoding unit 220 may entropy encode quantized transform coefficient blocks from the quantization unit 208. As another example, the entropy encoding unit 220 may entropy encode prediction syntax elements (e.g., motion information for inter-prediction or intra-mode information for intra-prediction) from the mode selection unit 202. The entropy encoding unit 220 may perform one or more entropy encoding operations on the syntax elements, which are another example of video data, to generate entropy-encoded data. For example, the entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, the entropy encoding unit 220 may operate in bypass mode where syntax elements are not entropy encoded.

The video encoder 200 may output a bitstream that includes the entropy encoded syntax elements needed to reconstruct blocks of a slice or picture. For example, the entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a MV and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

The video encoder 200 represents an example of a device configured to encode video data including a memory configured to store video data, and one or more processing units implemented in circuitry and configured to determine delta motion vectors from control point motion vectors of a neighboring block of a current block of video data, clip the delta motion vectors to a predefined range, and code the current block of video data using the clipped delta motion vectors.

Figure 4:
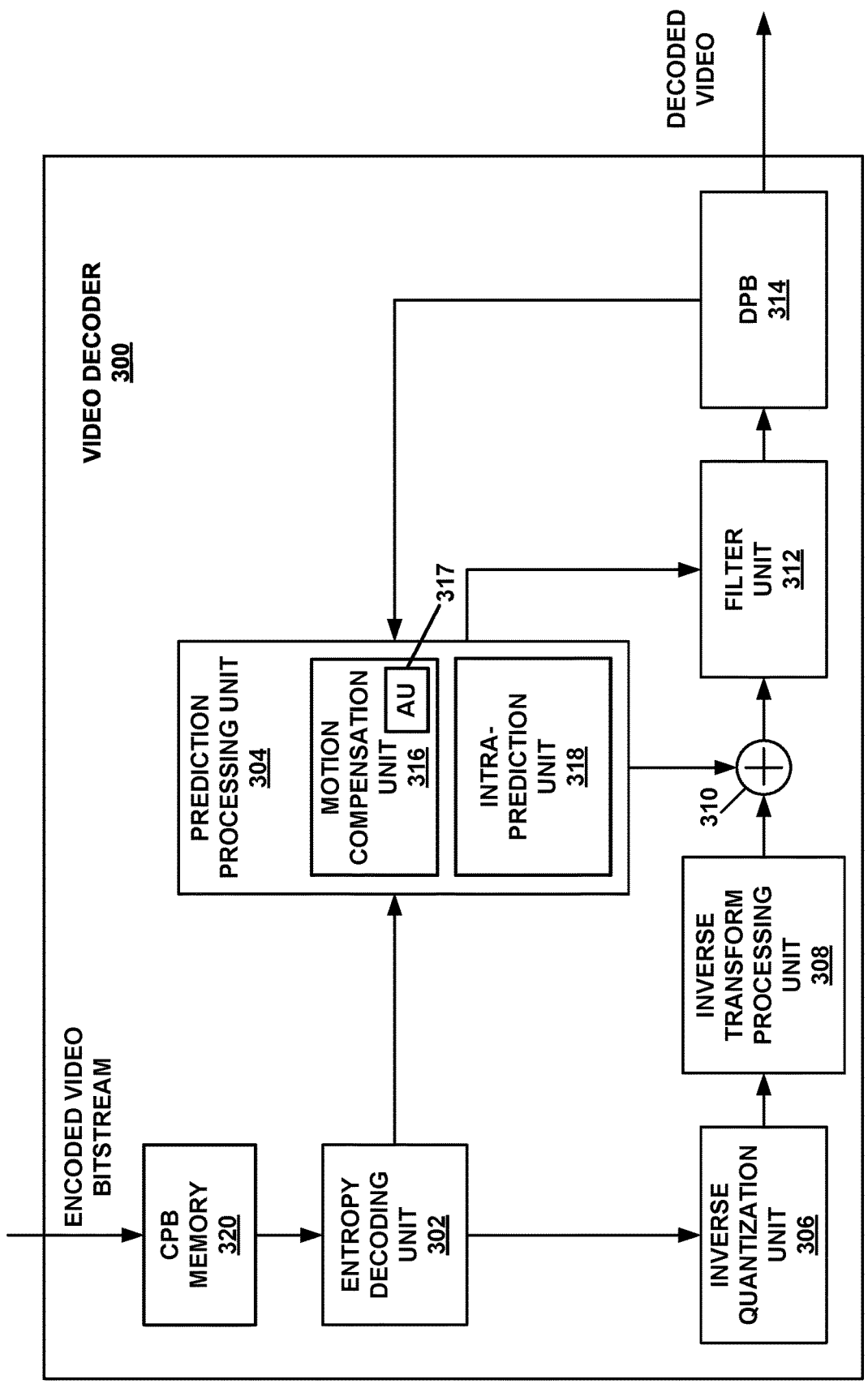
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, the video decoder 300 is described according to the techniques of JEM, VVC, and HEVC. However, the techniques of this disclosure may be performed by video coding devices that are configured to other video coding standards.

In the example of FIG. 4, the video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of the CPB memory 320, the entropy decoding unit 302, the prediction processing unit 304, the inverse quantization unit 306, the inverse transform processing unit 308, the reconstruction unit 310, the filter unit 312, and the DPB 314 may be implemented in one or more processors or in processing circuitry. Moreover, the video decoder 300 may include additional or alternative processors or processing circuitry to perform these and other functions.

The prediction processing unit 304 includes motion compensation unit 316 and intra-prediction unit 318. The prediction processing unit 304 may include addition units to perform prediction in accordance with other prediction modes. As examples, the prediction processing unit 304 may include a palette unit, an intra-block copy unit (which may form part of motion compensation unit 316), an affine unit (AU) 317, a linear model (LM) unit, or the like. In other examples, the video decoder 300 may include more, fewer, or different functional components.

The CPB memory 320 may store video data, such as an encoded video bitstream, to be decoded by the components of the video decoder 300. The video data stored in the CPB memory 320 may be obtained, for example, from computer-readable medium 110 (FIG. 1). The CPB memory 320 may include a CPB that stores encoded video data (e.g., syntax elements) from an encoded video bitstream. Also, the CPB memory 320 may store video data other than syntax elements of a coded picture, such as temporary data representing outputs from the various units of the video decoder 300. The DPB 314 generally stores decoded pictures, which the video decoder 300 may output and/or use as reference video data when decoding subsequent data or pictures of the encoded video bitstream. The CPB memory 320 and the DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. The CPB memory 320 and the DPB 314 may be provided by the same memory device or separate memory devices. In various examples, the CPB memory 320 may be on-chip with other components of the video decoder 300, or off-chip relative to those components.

Additionally or alternatively, in some examples, the video decoder 300 may retrieve coded video data from the memory 120 (FIG. 1). That is, the memory 120 may store data as discussed above with the CPB memory 320. Likewise, the memory 120 may store instructions to be executed by the video decoder 300, when some or all of the functionality of the video decoder 300 is implemented in software to executed by processing circuitry of the video decoder 300.

The various units shown in FIG. 4 are illustrated to assist with understanding the operations performed by the video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

The video decoder 300 may include ALUs, EFUs, digital circuits, analog circuits, and/or programmable cores formed from programmable circuits. In examples where the operations of the video decoder 300 are performed by software executing on the programmable circuits, on-chip or off-chip memory may store instructions (e.g., object code) of the software that the video decoder 300 receives and executes.

The entropy decoding unit 302 may receive encoded video data from the CPB and entropy decode the video data to reproduce syntax elements. The prediction processing unit 304, the inverse quantization unit 306, the inverse transform processing unit 308, the reconstruction unit 310, and the filter unit 312 may generate decoded video data based on the syntax elements extracted from the bitstream.

In general, the video decoder 300 reconstructs a picture on a block-by-block basis. The video decoder 300 may perform a reconstruction operation on each block individually (where the block currently being reconstructed, i.e., decoded, may be referred to as a "current block").

The entropy decoding unit 302 may entropy decode syntax elements defining quantized transform coefficients of a quantized transform coefficient block, as well as transform information, such as a quantization parameter (QP) and/or transform mode indication(s). The inverse quantization unit 306 may use the QP associated with the quantized transform coefficient block to determine a degree of quantization and, likewise, a degree of inverse quantization for the inverse quantization unit 306 to apply. The inverse quantization unit 306 may, for example, perform a bitwise left-shift operation to inverse quantize the quantized transform coefficients. The inverse quantization unit 306 may thereby form a transform coefficient block including transform coefficients.

After the inverse quantization unit 306 forms the transform coefficient block, the inverse transform processing unit 308 may apply one or more inverse transforms to the transform coefficient block to generate a residual block associated with the current block. For example, the inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, the prediction processing unit 304 generates a prediction block according to prediction information syntax elements, including prediction information syntax elements that were entropy decoded by the entropy decoding unit 302. For example, if the prediction information syntax elements indicate that the current block is inter-predicted, the motion compensation unit 316 may generate the prediction block. In this case, the prediction information syntax elements may indicate a reference picture in the DPB 314 from which to retrieve a reference block, as well as a motion vector identifying a location of the reference block in the reference picture relative to the location of the current block in the current picture. The motion compensation unit 316 may generally perform the inter-prediction process in a manner that is substantially similar to that described with respect to the motion compensation unit 224 (FIG. 3).

As another example, if the prediction information syntax elements indicate that the current block is intra-predicted, the intra-prediction unit 318 may generate the prediction block according to an intra-prediction mode indicated by the prediction information syntax elements. Again, the intra-prediction unit 318 may generally perform the intra-prediction process in a manner that is substantially similar to that described with respect to the intra-prediction unit 226 (FIG. 3). The intra-prediction unit 318 may retrieve data of neighboring samples to the current block from the DPB 314.

In another example, if the prediction information syntax elements indicate that the current block is affine predicted, the affine unit 317 may generate the prediction block according to affine mode. The affine unit 317 may determine delta motion vectors from CPMVs of a neighboring block of a current block of video data, scale the delta motion vectors and clip the delta motion vectors when generating a prediction block for the current block of video data being encoded.

The reconstruction unit 310 may reconstruct the current block using the prediction block and the residual block. For example, the reconstruction unit 310 may add samples of the residual block to corresponding samples of the prediction block to reconstruct the current block.

The filter unit 312 may perform one or more filter operations on reconstructed blocks. For example, the filter unit 312 may perform deblocking operations to reduce blockiness artifacts along edges of the reconstructed blocks. Operations of the filter unit 312 are not necessarily performed in all examples.

The video decoder 300 may store the reconstructed blocks in the DPB 314. As discussed above, the DPB 314 may provide reference information, such as samples of a current picture for intra-prediction and previously decoded pictures for subsequent motion compensation, to the prediction processing unit 304. Moreover, the video decoder 300 may output decoded pictures from DPB for subsequent presentation on a display device, such as the display device 118 of FIG. 1.

In this manner, the video decoder 300 represents an example of a video decoding device including a memory configured to store video data, and one or more processing units implemented in circuitry and configured to determine delta motion vectors from control point motion vectors of neighboring blocks of a current block of video data, clip the delta motion vectors to a predefined range, and code the current block of video data using the clipped delta motion vectors.

Figure 5:
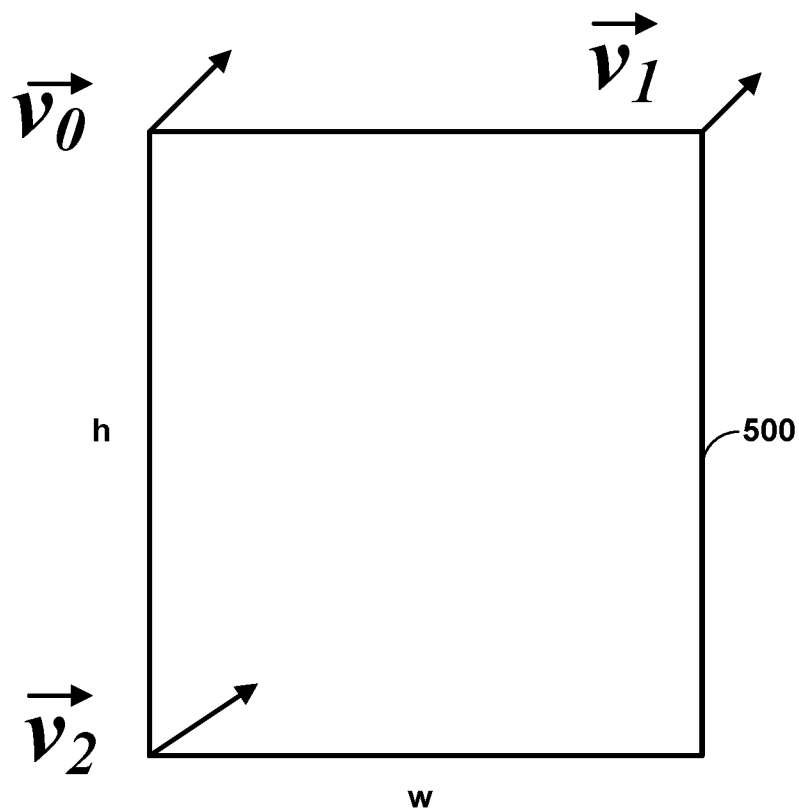
FIG. 5 is a conceptual diagram illustrating control points for a 6-parameter affine motion model.

FIG. 5 is a conceptual diagram illustrating control points for a 6-parameter affine motion model. One model of motion prediction is an affine model. A six-parameter affine motion model may be described as:

$$\begin{cases} v_x = ax + by + e \\ v_y = cx + dy + f \end{cases} \quad (1)$$

where $(v_x, v_y)$ is the motion vector at the coordinate $(x, y)$, and a, b, c, d, e, and f are the six parameters. The affine motion model for a block may also be described by the three motion vectors (MVS) $\vec{v}_0=(v_{0x}, v_{0y})$, $\vec{v}_1=(v_{1x}, v_{1y})$, and $\vec{v}_2=(v_{2x}, v_{2y})$ at three corners of the block 500 (sometimes referred to as control point motion vectors), as shown in FIG. 5. As shown in FIG. 5, $\vec{v}_0$ is at the top-left corner of the block 500, $\vec{v}_1$ is at the top-right corner of the block 500, and $\vec{v}_2$ is at the bottom-left corner of the block 500. The motion field is then described as $$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad (2)$$

where w and h are the width and height of the block.

A simplified 4-parameter affine model may be described as:

$$\begin{cases} v_x = ax - by + e \\ v_y = bx + ay + f \end{cases} \quad (3)$$

Similarly, the simplified 4-parameter affine model for a block can be described by two MVs $\vec{v}_0=(v_{0x}, v_{0y})$ and $\vec{v}_1=(v_{1x}, v_{1y})$ at two corners of the block. The motion field may be described as:

$$\begin{cases} v_x = \frac{(v_{1x} - v_{0x})}{w}x - \frac{(v_{1y} - v_{0y})}{h}y + v_{0x} \\ v_y = \frac{(v_{1y} - v_{0y})}{w}x + \frac{(v_{1x} - v_{0x})}{h}y + v_{0y} \end{cases} \quad (4)$$

where w and h are the width and height of the block.

Figure 6:
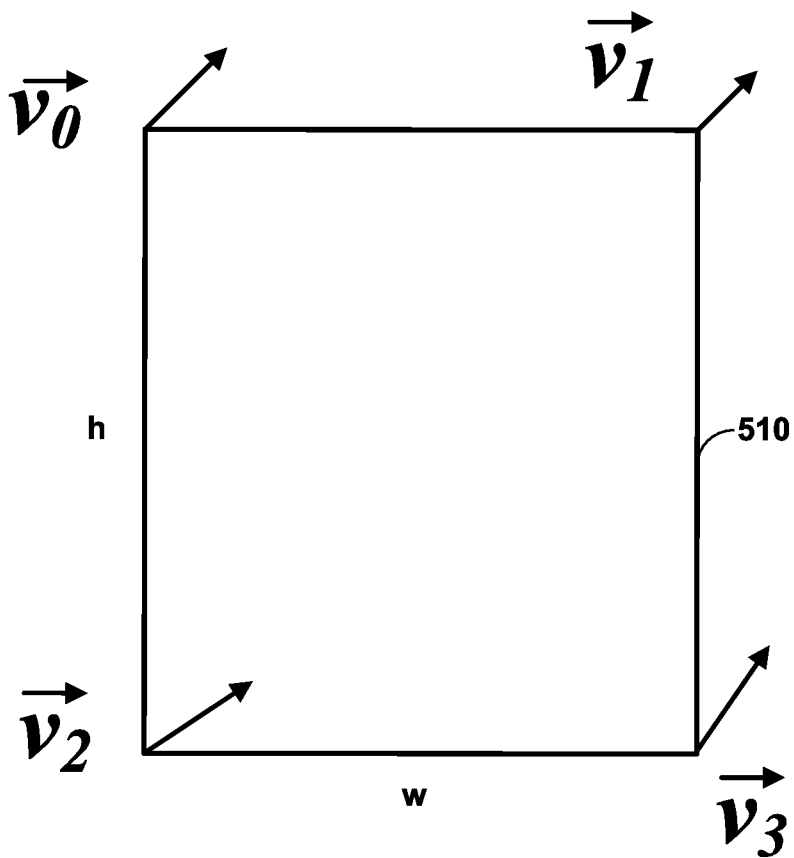
FIG. 6 is a conceptual diagram illustrating another example of control points for an affine motion model.

FIG. 6 is a conceptual diagram illustrating another example of control point motion vectors (e.g., $\vec{v}_0$, $\vec{v}_1$, $\vec{v}_2$, $\vec{v}_3$) for block 510 for an affine motion model. In the following, the MV $\vec{v}_i$ is referred to as a CPMV.

CPMVs are not necessarily the same as in FIG. 5 or in FIG. 6. Other CPMVs selections may also be used. For a 4-parameter affine model, the control point pairs can be selected from any two of the CPMVs $\{\vec{v}_0, \vec{v}_1, \vec{v}_2, \vec{v}_3\}$, as shown in FIG. 6. For a 6-parameter affine model, the control point set can be selected from any three of CPMVs. Given the selected CPMVs, the other MV can be calculated by the derived affine motion model.

The affine motion model may also be represented by an anchor MV $\vec{v}_0$ at coordinate $(x_0, y_0)$, a horizontal delta MV $\nabla \vec{v}_h$ and a vertical delta MV $\nabla \vec{v}_v$. The MV $\vec{v}$ at the coordinate (x, y) can be calculated as $\vec{v} = \vec{v}_0 + x*\nabla \vec{v}_h + y*\nabla \vec{v}_v$.

A CPMV representation can be converted to the representation with delta MVs. For example, $\vec{v}_0$ is the same as the top-left CPMV, $\nabla \vec{v}_h = (\vec{v}_1 - \vec{v}_0)/w$, $\nabla \vec{v}_v = (\vec{v}_2 - \vec{v}_0)/h$.

Note that the operations described above are vector operations. The addition, division, and multiplication operations are applied element wise.

As in the normal motion vector prediction techniques in HEVC, affine motion predictors can be derived from the affine motion vectors or normal motion vectors of the neighboring coded blocks. Example types of affine motion predictors include inherited affine motion vector predictors and constructed affine motion vector predictors.

Figure 7:
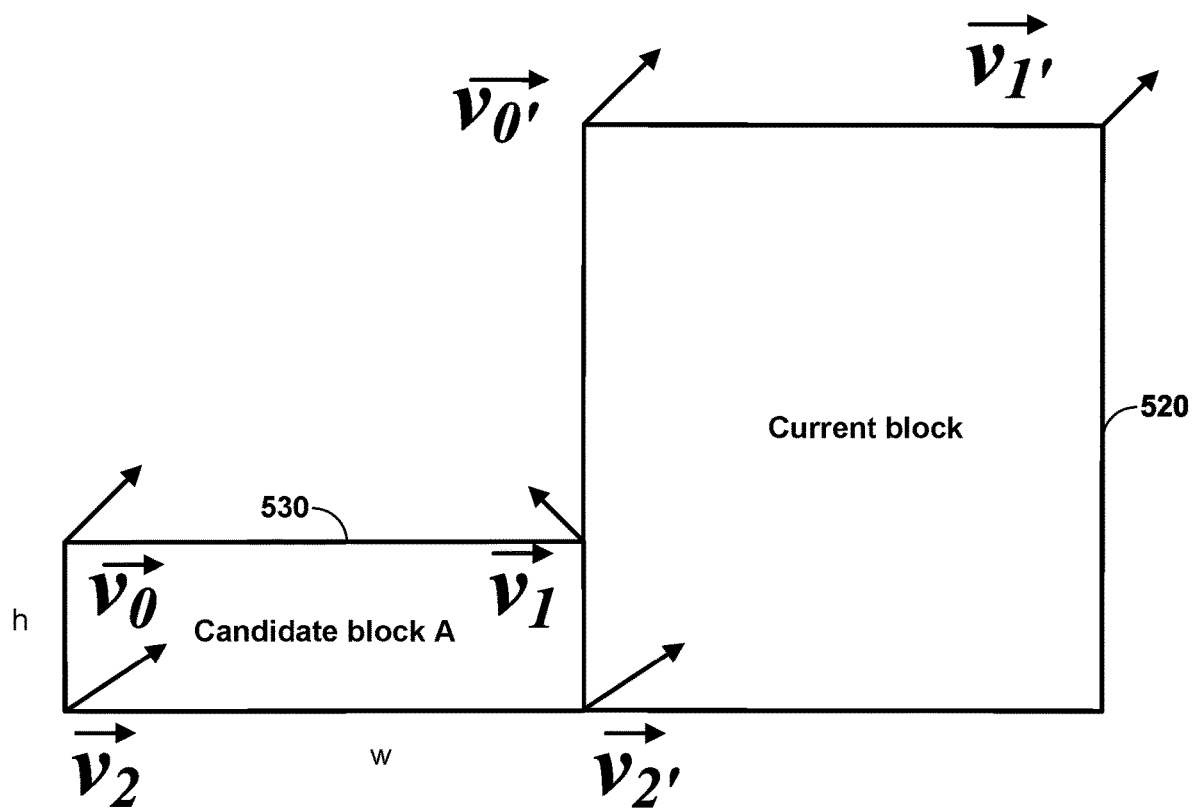
FIG. 7 is conceptual diagram illustrating control points for a current block and a candidate block.

When obtaining an inherited affine motion vector predictor (MVP), the video encoder 200 and the video decoder 300 may be configured to use the affine motion of a neighboring coded block to derive the predicted CPMVs of current block. This process operates under the assumption that the current block shares the same affine motion model as the neighboring coded block. In this context, the neighboring coded block is referred to as a candidate block. The candidate block may be selected from different spatial or temporal neighboring locations. An example is shown in FIG. 7. The affine motion vectors of the neighboring candidate block A 530 in FIG. 7 (represented as the motion vectors at the control-points) are: $\vec{v}_0 = (v_{0x}, v_{0y})$, $\vec{v}_1 = (v_{1x}, v_{1y})$, $\vec{v}_2 = (v_{2x}, v_{2y})$, the size of candidate block A 530 is (w, h), and the coordinates of control points of the neighboring candidate block A 530 are (x0, y0), (x1, y1), and (x2, y2). The predicted affine motion vectors $\vec{v}_0' = (v_{0x}', v_{0y}')$, $\vec{v}_0' = (v_{1x}', v_{1y}')$, $\vec{v}_2' = (v_{2x}', v_{2y}')$ at the control points of the current block 520 can be derived by replacing (x,y) in equation (2) with the coordinate difference between the control points of current block 520 and the top-left control point of neighboring candidate block A 530, such that:

$$\begin{cases} v_{0x}' = \frac{(v_{1x} - v_{0x})}{w}(x0' - x0) + \frac{(v_{2x} - v_{0x})}{h}(y0' - y0) + v_{0x} \\ v_{0y}' = \frac{(v_{1y} - v_{0y})}{w}(x0' - x0) + \frac{(v_{2y} - v_{0y})}{h}(y0' - y0) + v_{0y} \end{cases} \quad (5)$$

$$\begin{cases} v_{1x}' = \frac{(v_{1x} - v_{0x})}{w}(x1' - x0) + \frac{(v_{2x} - v_{0x})}{h}(y1' - y0) + v_{0x} \\ v_{1y}' = \frac{(v_{1y} - v_{0y})}{w}(x1' - x0) + \frac{(v_{2y} - v_{0y})}{h}(y1' - y0) + v_{0y} \end{cases} \quad (6)$$

$$\begin{cases} v_{2x}' = \frac{(v_{1x} - v_{0x})}{w}(x2' - x0) + \frac{(v_{2x} - v_{0x})}{h}(y2' - y0) + v_{0x} \\ v_{2y}' = \frac{(v_{1y} - v_{0y})}{w}(x2' - x0) + \frac{(v_{2y} - v_{0y})}{h}(y2' - y0) + v_{0y} \end{cases} \quad (7)$$

wherein (x0', y0'), (x1',y1'), and (x2', y2') are the coordinates of control-points in current block. If represented as delta MVs, $\vec{v}_0' = v_{0x} + (x0'-x0)*\nabla \vec{v}_h + (y0'-y0)*\nabla \vec{v}_v$, $\vec{v}_1' = v_{0x} + (x1'-x0)*\nabla \vec{v}_h + (y1'-y0)*\nabla \vec{v}_v$, $\vec{v}_2' = v_{0x} + (x2'-x0)*\nabla \vec{v}_h + (y2'-y0)*\nabla \vec{v}_v$.

Similarly, if the neighboring candidate block's affine model is 4-parameter affine model, then the equation (4) is applied. If the affine model for the current block is 4-parameter affine model, then equation (7) can be ignored.

Figure 8:
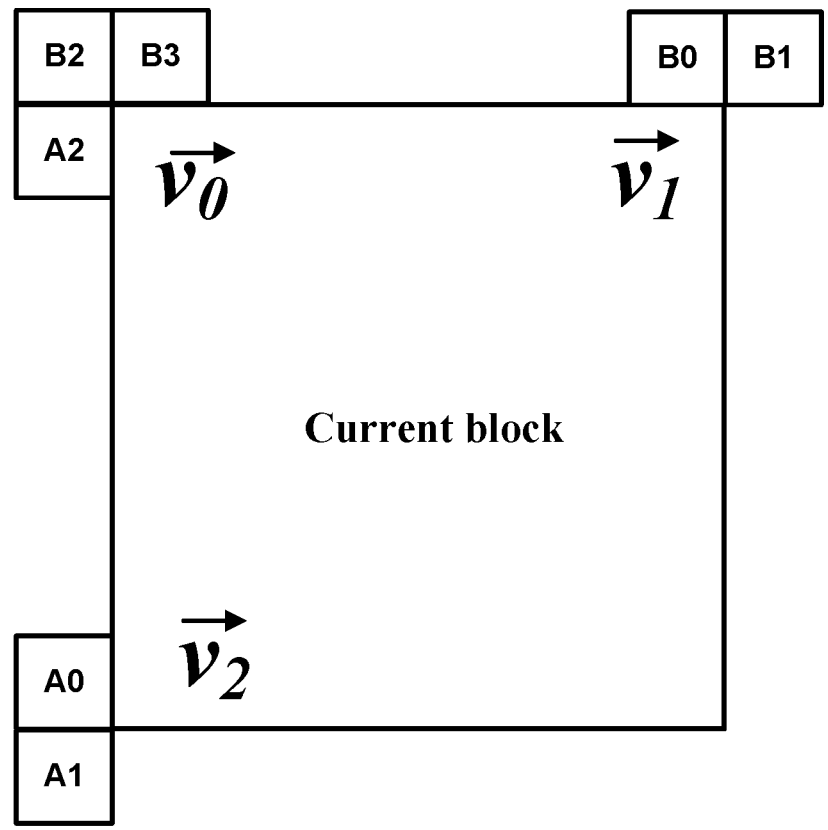
FIG. 8 is conceptual diagram illustrating example candidate blocks.

FIG. 8 is a conceptual diagram illustrating example candidate blocks. In one example, the candidate block can be located at locations A0, B0, B1, A1, B2, as shown in FIG. 8.

A constructed affine motion vector predictor is derived by predicting the motion vectors at the control points of the current block as the normal motion vector prediction. In other words, the video encoder 200 or the video decoder 300 may derive the constrained affine motion vector predictor in a similar manner to the manner the video encoder 200 or the video decoder 300 would derive an affine motion vector predictor. For example, as shown in FIG. 8, the motion vector $\vec{v}_0$ at the top-left control point can be predicted by the motion vector at B2, B3 or A3, the motion vector $\vec{v}_2$ at the top-right control point can be predicted by the motion vector at B0 or B1, and the motion vector $\vec{v}_2$ at the left-bottom control point can be predicted by the motion vector at A0 or A1.

In accordance with one example of this disclosure, the video encoder 200 and the video decoder 300 may be configured to clip the value of delta MVs $$\nabla \vec{v}_h = \left(\frac{(v_{1x} - v_{0x})}{w}, \frac{(v_{1y} - v_{0y})}{w}\right) \text{ and } \nabla \vec{v}_v = \left(\frac{(v_{2x} - v_{0x})}{h}, \frac{(v_{2y} - v_{0y})}{h}\right)$$

to some predefined range when used for affine motion inheritance (e.g., in equations (5), (6) and (7)). For example, the predefined range may be from $-2^k$ to $2^k$, where k is an integer value. For example, k may be 7 for 8 bit representation of the delta MVs or 15 for 16 bit representation of the delta MVs. In other examples, the base unit may be irrelevant to the range. For example, one unit could be 1/16, 1/32, 1/64, or 1/128 samples. In another example, the predefined range may be a fixed unit of 1/16, 1/32, 1/64, or 1/128 samples, and based on the precision (also referred to as resolution) of the delta MVs, the predefined range may be scaled. For example, if the base unit for the range is 1/64, but the precision of the delta MVs is 1/128, then the range may be scaled up by 2. By clipping the value of the delta MVs, the delta MVs may be stored using fewer bits, resulting in the reduction of the amount of memory needed for storing delta MVs. Therefore, in some implementations, the video encoder 200 and the video decoder 300 may be configured to store the delta MVs with a certain number of bits. Typically, the number of bits is less than that of storing the original MV. For example, testing has shown that BD-rate performance of the reduction in bits is around 0.1%. The average bit rate for the same quality of video may increase by around 0.1%. In the following, the 6-parameter affine motion is assumed. However, clipping for 4-parameter affine motion may be similarly applied. In other words, the video encoder 200 and the video decoder 300 may clip delta motion vectors for the 6-parameter affine motion model and/or the 4-parameter affine motion model. Also, the distance between $\vec{v}_0$ and $\vec{v}_1$, $\vec{v}_0$ and $\vec{v}_2$ are assumed to be w and h. However, the techniques of this disclosure can also be applied if the distances between the MVs are different values.

In view of the foregoing, in one example of the disclosure, the video encoder 200 and the video decoder 300 may be configured to determine delta motion vectors from control point motion vectors of a neighboring block of a current block of video data, clip the delta motion vectors to a predefined range, and code the current block of video data using the clipped delta motion vectors.

In one example, the video encoder 200 and the video decoder 300 may be configured to clip the values of the delta motion vectors $v_{1x}-v_{0x}$, $v_{1y}-v_{0y}$, $v_{2x}-v_{0x}$, $v_{2y}-v_{0y}$ to the predefined range.

In another example, the video encoder 200 and the video decoder 300 may be configured to clip scaled values of the delta motion vectors $v_{1x}-v_{0x}$, $v_{1y}-v_{0y}$, $v_{2x}-v_{0x}$, $v_{2y}-v_{0y}$ to the predefined range. For example, the scaled values are:

$$\frac{(v_{1x}-v_{0x})}{S}, \frac{(v_{1y}-v_{0y})}{S}, \frac{(v_{2x}-v_{0x})}{S}, \frac{(v_{2y}-v_{0y})}{S}.$$

S can be 1, 2 or other predefined values. S may also be determined by the resolution of the delta MV. For example, if the anchor MV resolution (or precision) is different than the delta resolution (or precision), the delta MV resolution may be scaled. As such, in this example, the video encoder 200 and the video decoder 300 may be configured to scale the delta motion vectors prior to clipping, wherein the scaling is based on a scaling factor S. For example, the video encoder 200 and the video decoder 300 may include means for scaling the delta motion vectors.

In another example, the video encoder 200 and the video decoder 300 may be configured clip the values of $$\frac{(v_{1x}-v_{0x})}{w}, \frac{(v_{1y}-v_{0y})}{w}, \frac{(v_{2x}-v_{0x})}{h}, \frac{(v_{2y}-v_{0y})}{h}$$

to the predefined range. In this example, the video encoder 200 and the video decoder 300 may be configured to scale the delta motion vectors prior to clipping, wherein the scaling is based on a width or a height of a corresponding neighboring block.

In another example, the video encoder 200 and the video decoder 300 may be configured to clip the scaled values of $$\frac{(v_{1x}-v_{0x})}{w}, \frac{(v_{1y}-v_{0y})}{w}, \frac{(v_{2x}-v_{0x})}{h}, \frac{(v_{2y}-v_{0y})}{h}$$

to the predefined range. For example, the scaled values are:

$$N*\frac{(v_{1x}-v_{0x})}{w}, N*\frac{(v_{1y}-v_{0y})}{w}, N*\frac{(v_{2x}-v_{0x})}{h}, N*\frac{(v_{2y}-v_{0y})}{h},$$

wherein N is predefined. In one example, N is the maximum size of a block. In another example, N is determined by w and h. In still another embodiment N is determined by the resolution of the MV. In still another example, N is the maximum size of a block divided by k, wherein k is an integer constant such as 1, 2 or other integer numbers. The scaling may also be implemented by left shifting if N is power of 2. In one example, N is 128. Then, the multiply by N can be replaced by <<7, where << is a bitwise left shift. Note that the values in equation (5), (6) and (7) are all scaled by N if scaled values are used. The values of $v_{ix}'$, $v_{iy}'$ can be obtained by scaling down by N.

As such, in the foregoing example, the video encoder 200 and the video decoder 300 may be configured to scale the delta motion vectors prior to clipping, wherein the scaling is based on a width or a height of a corresponding neighboring block and a scaling factor N. N may be a function of a width and/or a height of a neighboring block, a resolution of an MV or a maximum size of a block.

In one example, the range for clipping is determined such that the clipped value can be represented in certain number of bits. In one example, the range is $(-2^{B-1}, 2^{B-1}-1)$, wherein B is the number of bits to represent the clipped value. B can be 8, 16 or other integer numbers. B can be a predefined fixed value or signaled from the video encoder 200 to the video decoder 300.

In one example implementation to the VVC standard, the derivation process for luma affine control point motion vectors from a neighboring block as described in Bross, et. al., "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, Mass., 9-18 Jan. 2019, JVET-M1001 is modified as follows. Additions to JVET-M1001 are shown between <ADD> and </ADD>. Deletions from JVET-M1001 are shown between <DELETE> and </DELETE>.

Derivation Process for Luma Affine Control Point Motion Vectors from a Neighbouring Block Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
a luma location (xNb, yNb) specifying the top-left sample of the neighbouring luma coding block relative to the top-left luma sample of the current picture,
two variables nNbW and nNbH specifying the width and the height of the neighbouring luma coding block,
the number of control point motion vectors numCpMv.
Output of this process are the luma affine control point vectors cpMvLX[cpIdx] with cpIdx=0 . . . numCpMv−1 and X being 0 or 1.
The variable isCTUboundary is derived as follows:
If all the following conditions are true, isCTUboundary is set equal to TRUE:
((yNb+nNbH) % CtbSizeY) is equal to 0
yNb+nNbH is equal to yCb
Otherwise, isCTUboundary is set equal to FALSE.
The variables log 2NbW and log 2NbH are derived as follows:

log 2NbW=Log 2(nNbW)     (8-593)

log 2NbH=Log 2(nNbH)     (8-594)

The variables mvScaleHor, mvScaleVer, dHorX and dVerX are derived as follows:
If isCTUboundary is equal to TRUE, the following applies:

mvScaleHor=MvLX[xNb][yNb+nNbH−1][0]<<7     (8-595)

mvScaleVer=MvLX[xNb][yNb+nNbH−1][1]<<7     (8-596)

dHorX=(MvLX[xNb+nNbW−1][yNb+nNbH−1][0]−
    MvLX[xNb][yNb+nNbH−1][0])<<(7−log
    2NbW)     (8-597)

dVerX=(MvLX[xNb+nNbW−1][yNb+nNbH−1][1]−
    MvLX[xNb][yNb+nNbH−1][1])<<(7−log
    2NbW)     (8-598)

Otherwise (isCTUboundary is equal to FALSE), the following applies:

$$mvScaleHor=CpMvLX[xNb][yNb][0][0]<<7 \quad (8\text{-}599)$$

$$mvScaleVer=CpMvLX[xNb][yNb][0][1]<<7 \quad (8\text{-}600)$$

$$dHorX=(CpMvLX[xNb+nNbW-1][yNb][1][0]-CpMvLX[xNb][yNb][0][0])<<(7-\log 2NbW) \quad (8\text{-}601)$$

$$dVerX=(CpMvLX[xNb+nNbW-1][yNb][1][1]-CpMvLX[xNb][yNb][0][1])<<(7-\log 2NbW) \quad (8\text{-}602)$$

<ADD>$dHorX=Clip3(-2^{B-1},2^{B-1}-1,dHorX)$ $dVerX=Clip3(-2^{B-1},2^{B-1}-1,dVerX)$</ADD>

The variables dHorY and dVerY are derived as follows:
If isCTUboundary is equal to FALSE and MotionModelIdc[xNb][yNb] is equal to 2, the following applies:

$$dHorY=(CpMvLX[xNb][yNb+nNbH-1][2][0]-CpMvLX[xNb][yNb][2][0])<<(7-\log 2NbH) \quad (8\text{-}603)$$

$$dVerY=(CpMvLX[xNb][yNb+nNbH-1][2][1]-CpMvLX[xNb][yNb][2][1])<<(7-\log 2NbH) \quad (8\text{-}604)$$

Otherwise (isCTUboundary is equal to TRUE or MotionModelIdc[xNb][yNb] is equal to 1), the following applies, $$dHorY=-dVerX \quad (8\text{-}605)$$

$$dVerY=dHorX \quad (8\text{-}606)$$

<ADD>$dHorY=Clip3(-2^{B-1},2^{B-1}-1,dHorY)$ $dVerY=Clip3(-2^{B-1},2^{B-1}-1,dVerY)$</ADD>

The luma affine control point motion vectors cpMvLX[cpIdx] with cpIdx=0 . . . numCpMv−1 and X being 0 or 1 are derived as follows:
When isCTUboundary is equal to TRUE, yNb is set equal to yCb.
The first two control point motion vectors cpMvLX[0] and cpMvLX[1] are derived as follows:

$$cpMvLX[0][0]=(mvScaleHor+dHorX*(xCb-xNb)+dHorY*(yCb-yNb)) \quad (8\text{-}607)$$

$$cpMvLX[0][1]=(mvScaleVer+dVerX*(xCb-xNb)+dVerY*(yCb-yNb)) \quad (8\text{-}608)$$

$$cpMvLX[1][0]=(mvScaleHor+dHorX*(xCb+cbWidth-xNb)+dHorY*(yCb-yNb)) \quad (8\text{-}609)$$

$$cpMvLX[1][1]=(mvScaleVer+dVerX*(xCb+cbWidth-xNb)+dVerY*(yCb-yNb)) \quad (8\text{-}610)$$

If numCpMv is equal to 3, the third control point vector cpMvLX[2] is derived as follows:

$$cpMvLX[2][0]=(mvScaleHor+dHorX*(xCb-xNb)+dHorY*(yCb+cbHeight-yNb)) \quad (8\text{-}611)$$

$$cpMvLX[2][1]=(mvScaleVer+dVerX*(xCb-xNb)+dVerY*(yCb+cbHeight-yNb)) \quad (8\text{-}612)$$

The rounding process for motion vectors as specified in clause 8.4.2.14 is invoked the with mvX set equal to cpMvLX[cpIdx], rightShift set equal to 7, and leftShift set equal to 0 as inputs and the rounded cpMvLX[cpIdx] as output, with X being 0 or 1 and cpIdx=0 . . . numCpMv−1.

In another implementation to the VVC standard, the derivation process for luma affine control point motion vectors from a neighboring block in JVET-M1001 is modified as follows:

Derivation Process for Luma Affine Control Point Motion Vectors from a Neighbouring Block Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
a luma location (xNb, yNb) specifying the top-left sample of the neighbouring luma coding block relative to the top-left luma sample of the current picture,
two variables nNbW and nNbH specifying the width and the height of the neighbouring luma coding block,
the number of control point motion vectors numCpMv.
Output of this process are the luma affine control point vectors cpMvLX[cpIdx] with cpIdx=0 . . . numCpMv−1 and X being 0 or 1.
The variable isCTUboundary is derived as follows:
If all the following conditions are true, isCTUboundary is set equal to TRUE:
((yNb+nNbH) % CtbSizeY) is equal to 0
yNb+nNbH is equal to yCb
Otherwise, isCTUboundary is set equal to FALSE.
The variables log 2NbW and log 2NbH are derived as follows:

$$\log 2NbW=Log 2(nNbW) \quad (8\text{-}593)$$

$$\log 2NbH=Log 2(nNbH) \quad (8\text{-}594)$$

The variables mvScaleHor, mvScaleVer, dHorX and dVerX are derived as follows:
If isCTUboundary is equal to TRUE, the following applies:

$$mvScaleHor=MvLX[xNb][yNb+nNbH-1][0]<<7 \quad (8\text{-}595)$$

$$mvScaleVer=MvLX[xNb][yNb+nNbH-1][1]<<7 \quad (8\text{-}596)$$

$$dHorX=<ADD>Clip3</ADD>(<ADD>-2^{B-1},2^{B-1}-1,</ADD>MvLX[xNb+nNbW-1][yNb+nNbH-1][0]MvLX[xNb][yNb+nNb H-1][0])<<(7-\log 2NbW) \quad (8\text{-}597)$$

$$dVerX=<ADD>Clip3</ADD>(<ADD>-2^{B-1},2^{B-1}-1,</ADD>MvLX[xNb+nNbW-1][yNb+nNbH-1][1]-MvLX[xNb][yNb+nNb H-1][1])<<(7-\log 2NbW) \quad (8\text{-}598)$$

Otherwise (isCTUboundary is equal to FALSE), the following applies:

$$mvScaleHor=CpMvLX[xNb][yNb][0][0]<<7 \quad (8\text{-}599)$$

$$mvScaleVer=CpMvLX[xNb][yNb][0][1]<<7 \quad (8\text{-}600)$$

$$dHorX=<ADD>Clip3</ADD>(<ADD>-2^{B-1},2^{B-1}-1,</ADD>CpMvLX[xNb+nNbW-1][yNb][1][0]-CpMvLX[xNb][yNb][0][0])<<(7-\log 2NbW) \quad (8\text{-}601)$$

$$dVerX=<ADD>Clip3</ADD>(<ADD>-2^{B-1},2^{B-1}-1,</ADD>CpMvLX[xNb+nNbW-1][yNb][1][1]-CpMvLX[xNb][yNb][0][1])<<(7-\log 2NbW) \quad (8\text{-}602)$$

The variables dHorY and dVerY are derived as follows:
If isCTUboundary is equal to FALSE and MotionModelIdc[xNb][yNb] is equal to 2, the following applies:

dHorY=<ADD>Clip3</ADD>(<ADD>-2$^{B-1}$,2$^{B-1}$-</ADD>1,CpMvLX[xNb][yNb+nNbH-1][2][0]-CpMvLX[xNb][yNb][2][0])<<(7-log 2NbH)  (8-603)

dVerY=<ADD>Clip3</ADD>(<ADD>-2$^{B-1}$,2$^{B-1}$-1,</ADD>CpMvLX[xNb][yNb+nNbH-1][2][1]-CpMvLX[xNb][yNb][2][1])<<(7-log 2NbH)  (8-604)

Otherwise (isCTUboundary is equal to TRUE or MotionModelIdc[xNb][yNb] is equal to 1), the following applies, dHorY=-dVerX  (8-605)

dVerY=dHorX  (8-606)

The luma affine control point motion vectors cpMvLX[cpIdx] with cpIdx=0 ... numCpMv-1 and X being 0 or 1 are derived as follows:
  When isCTUboundary is equal to TRUE, yNb is set equal to yCb.
  The first two control point motion vectors cpMvLX[0] and cpMvLX[1] are derived as follows:

cpMvLX[0][0]=(mvScaleHor+dHorX*(xCb-xNb)+dHorY*(yCb-yNb))  (8-607)

cpMvLX[0][1]=(mvScaleVer+dVerX*(xCb-xNb)+dVerY*(yCb-yNb))  (8-608)

cpMvLX[1][0]=(mvScaleHor+dHorX*(xCb+cbWidth-xNb)+dHorY*(yCb-yNb))  (8-609)

cpMvLX[1][1]=(mvScaleVer+dVerX*(xCb+cbWidth-xNb)+dVerY*(yCb-yNb))  (8-610)

If numCpMv is equal to 3, the third control point vector cpMvLX[2] is derived as follows:

cpMvLX[2][0]=(mvScaleHor+dHorX*(xCb-xNb)+dHorY*(yCb+cbHeight-yNb))  (8-611)

cpMvLX[2][1]=(mvScaleVer+dVerX*(xCb-xNb)+dVerY*(yCb+cbHeight-yNb))  (8-612)

The rounding process for motion vectors as specified in clause 8.4.2.14 is invoked the with mvX set equal to cpMvLX[cpIdx], rightShift set equal to 7, and leftShift set equal to 0 as inputs and the rounded cpMvLX[cpIdx] as output, with X being 0 or 1 and cpIdx= 0 ... numCpMv-1.

In another example of this disclosure, affine motion inheritance from the above-left neighboring coded block (B2 in FIG. 8) is prohibited. In other words, in this example, the video encoder 200 and the video decoder 300 may not use affine motion inheritance from the above-left neighboring coded block. Let (xCurr, yCurr) be the coordinate of the top-left pixel of the current block, then affine motion inheritance is prohibited if the x component of the neighboring block's coordinate is less than xCurr and the y component of the coordinate is less than yCurr. Therefore, affine motion inheritance can only be from the left or above neighboring coded blocks. In this way, the buffer size can be saved by ⅓ in the memory-optimized implementation (e.g., as described in Zhou, et. al. "CE4-related: A clean up for affine mode," Joint Video Experts Team (WET) of ITU-T SG 16 WP 3 and ISO/IEC JTC 1/SC 29/WG 11, 12$^{th}$ Meeting: Macao, CN, 3-12 Oct. 2018, WET-L0047).

Note that the techniques of this disclosure can also be applied to normal motion vector prediction, wherein motion vector predictor from above-left neighboring coded block is prohibited.

Figure 9:
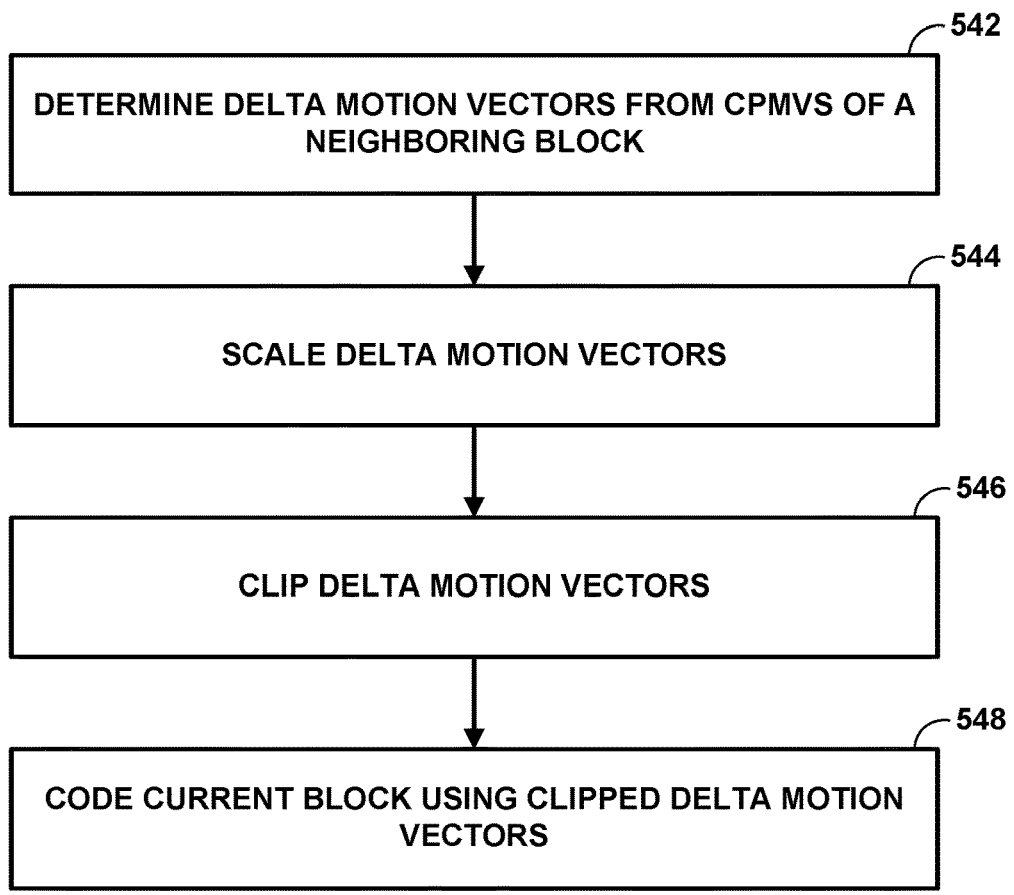
FIG. 9 is a flowchart illustrating example techniques according to the present disclosure.

FIG. 9 is a flow diagram illustrating techniques of the present disclosure. The video encoder 200 (e.g., the affine unit 223) or the video decoder 300 (e.g., the affine unit 317) may determine delta motion vectors from CPMVs of a neighboring block of a current block of video data (542). For example, the video encoder 200 or the video decoder 300 may determine a CPMV representation for the affine motion model and may convert the CPMV representation into a representation with delta MVs. For example, $\vec{v}_0$ is the same as the top-left CPMV, $\nabla\vec{v}_h=(\vec{v}_1-\vec{v}_0)/w$, $\nabla\vec{v}_v=(\vec{v}_2-\vec{v}_0)/h$.

In some examples, the neighboring blocks do not include an above-left neighboring block relative to the current block. In other examples, the neighboring blocks include an above neighboring block and a left neighboring block. In some examples, the neighboring blocks include only an above neighboring block and a left neighboring block.

In some examples, the video encoder 200 (e.g., the affine unit 223) or the video decoder 300 (e.g., the affine unit 317) may scale the delta motion vectors (544). In other examples, the video encoder 200 or the video decoder 300 may not scale the delta motion vectors and proceed directly to box 546. For example, the video encoder 200 (e.g., the affine unit 223) or the video decoder 300 (e.g., the affine unit 317) may scale the delta motion vectors based on a scaling factor S. Scaling factor S may be a predefined value or may be determined based on a resolution of the MV. In other examples, the video encoder 200 (e.g., the affine unit 223) or the video decoder 300 (e.g., the affine unit 317) may scale the delta motion vectors based on a width or a height of a corresponding neighboring block. In some examples, the video encoder 200 (e.g., the affine unit 223) or the video decoder 300 (e.g., the affine unit 317) may scale the delta motion vectors based on a width or a height of a corresponding neighboring block and a scaling factor N. In some examples, the scaling factor N may be a function of a width and/or a height of a neighboring block, a resolution of a motion vector, or a maximum size of a block.

The video encoder 200 (e.g., the affine unit 223) or the video decoder 300 (e.g., the affine unit 317) may clip the delta motion vectors (or the scaled delta motion vectors) to within a predefined range (546). For example, the video encoder 200 (e.g., the affine unit 223) or the video decoder 300 (e.g., the affine unit 317) may clip the delta motion vectors to a given number of bits B, such as an integer number. In some examples, the number of bits may be a predetermined fixed value. In other examples, the video encoder 200 may determine the number of bits and signal the number of bits to the video decoder 300.

The video encoder 200 or the video decoder 300 may code the current block using the clipped delta motion vectors. For example, the video encoder 200 may form a prediction block for the current block using the clipped delta MVs and encode the current block using the prediction block. The video decoder 300 may form the prediction block for the current block using the clipped delta MVs and decode the current block using the prediction block.

Figure 10:
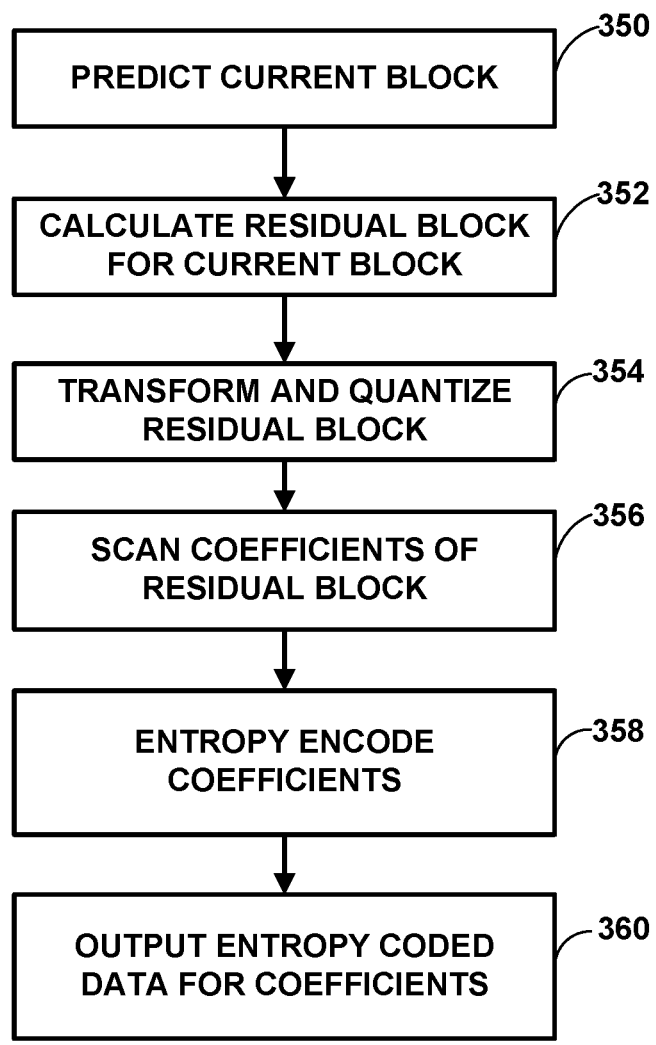
FIG. 10 is a flowchart illustrating an example encoding method.

FIG. 10 is a flowchart illustrating an example method for encoding a current block. The current block may comprise a current CU. Although described with respect to the video encoder 200 (FIGS. 1 and 3), it should be understood that other devices may be configured to perform a method similar to that of FIG. 10.

In this example, the video encoder 200 initially predicts the current block (350). For example, the video encoder 200 may form a prediction block for the current block. In forming the prediction block using an affine prediction mode, the video encoder 200 may determine delta motion vectors from control point motion vectors of a neighboring block of the current block. In some examples, the video encoder 200 may scale the delta motion vectors as discussed above. In other examples, the video encoder 200 may not scale the delta motion vectors. The video encoder 200 may clip the delta motion vectors (or the scaled delta motion vectors) to within a predefined range.

The video encoder 200 may then calculate a residual block for the current block (352). To calculate the residual block, the video encoder 200 may calculate a difference between the original, uncoded block and the prediction block for the current block. The video encoder 200 may then transform and quantize coefficients of the residual block (354). Next, the video encoder 200 may scan the quantized transform coefficients of the residual block (356). During the scan, or following the scan, the video encoder 200 may entropy encode the coefficients (358). For example, the video encoder 200 may encode the coefficients using CAVLC or CABAC. The video encoder 200 may then output the entropy coded data of the block (360).

Figure 11:
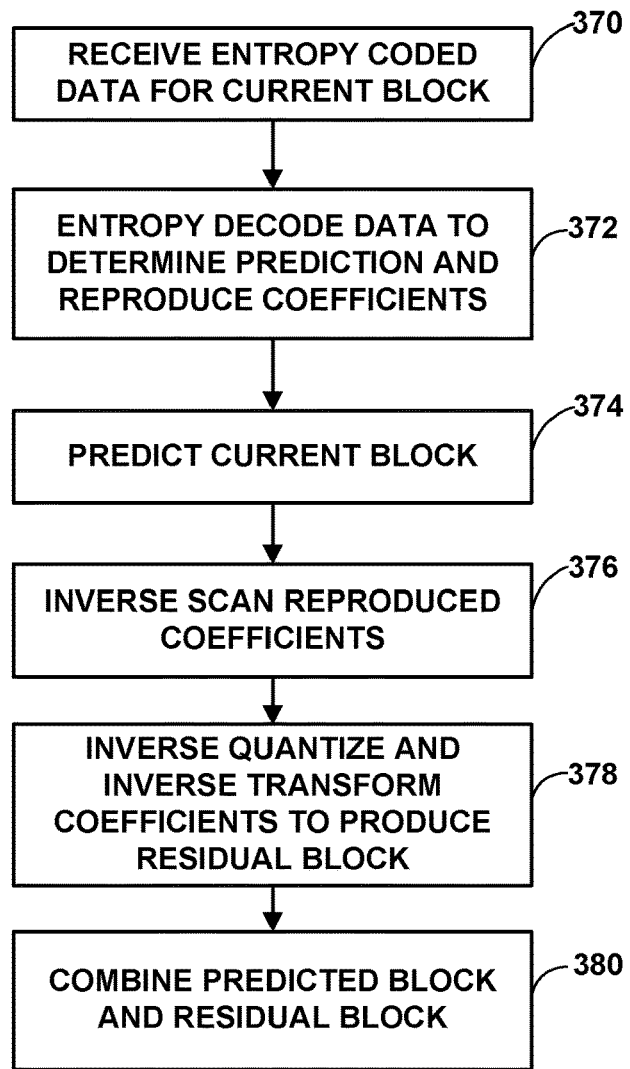
FIG. 11 is a flowchart illustrating an example decoding method.

FIG. 11 is a flowchart illustrating an example method for decoding a current block of video data. The current block may comprise a current CU. Although described with respect to the video decoder 300 (FIGS. 1 and 4), it should be understood that other devices may be configured to perform a method similar to that of FIG. 11.

The video decoder 300 may receive entropy coded data for the current block, such as entropy coded prediction information and entropy coded data for coefficients of a residual block corresponding to the current block (370). The video decoder 300 may entropy decode the entropy coded data to determine prediction information for the current block and to reproduce coefficients of the residual block (372). The video decoder 300 may predict the current block (374), e.g., using an intra- or inter-prediction mode as indicated by the prediction information for the current block, to calculate a prediction block for the current block. For an affine prediction mode, in forming the prediction block, the video decoder 300 may determine delta motion vectors from control point motion vectors of a neighboring block of the current block. In some examples, the video decoder 300 may scale the delta motion vectors as discussed above. In other examples, the video decoder 300 may not scale the delta motion vectors. The video decoder 300 may clip the delta motion vectors (or the scaled delta motion vectors) to within a predefined range.

The video decoder 300 may then inverse scan the reproduced coefficients (376), to create a block of quantized transform coefficients. The video decoder 300 may then inverse quantize and inverse transform the coefficients to produce a residual block (378). The video decoder 300 may ultimately decode the current block by combining the prediction block and the residual block (380).

Various examples of this disclosure include the examples that follow.

Example 1

A method of coding video data, the method comprising determining delta motion vectors from control point motion vectors of neighboring blocks of a current block, clipping the delta motion vectors to a predefined range, and coding the current block of video data using the clipped delta motion vectors.

Example 2

The method of example 1, further comprising scaling the delta motion vectors prior to clipping.

Example 3

The method of example 2, wherein scaling the delta motion vectors prior to clipping comprises scaling the delta motion vectors prior to clipping, wherein the scaling is based on a scaling factor S.

Example 4

The method of example 2, wherein scaling the delta motion vectors prior to clipping comprises scaling the delta motion vectors prior to clipping, wherein the scaling is based on a width or a height of a corresponding neighboring block.

Example 5

The method of example 2, wherein scaling the delta motion vectors prior to clipping comprises scaling the delta motion vectors prior to clipping, wherein the scaling is based on a width or a height of a corresponding neighboring block and a scaling factor N.

Example 6

The method of example 5, wherein N is a function of a width and/or a height of a neighboring block, a resolution of a motion vector, or a maximum size of a block.

Example 7

The method of example 1, wherein the neighboring blocks do not include an above-left neighboring block relative to the current block.

Example 8

The method of example 1, wherein the neighboring blocks include an above neighboring block and a left neighboring block.

Example 9

The method of example 1, wherein the neighboring blocks include only an above neighboring block and a left neighboring block.

Example 10

The method of any combination of examples 1-9.

Example 11

The method of any of examples 1-10, wherein coding comprises decoding.

Example 12

The method of any of examples 1-10, wherein coding comprises encoding.

Example 13

A device for coding video data, the device comprising one or more means for performing the method of any of examples 1-10.

Example 14

The device of example 13, wherein the one or more means comprise one or more processors implemented in circuitry.

Example 15

The device of any of examples 13 and 14, further comprising a memory to store the video data.

Example 16

The device of any of examples 13-15, further comprising a display configured to display decoded video data.

Example 17

The device of any of examples 13-16, wherein the device comprises one or more of a camera, a computer, a mobile device, a broadcast receiver device, or a set-top box.

Example 18

The device of any of examples 13-17 wherein the device comprises a video decoder.

Example 19

The device of any of examples 13-18, wherein the device comprises a video encoder.

Example 20

A computer-readable storage medium having stored thereon instructions that, when executed, cause one or more processors to perform the method of any of examples 1-10.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for coding video data, the device comprising:
 a memory configured to store a current block of video data; and
 one or more processors implemented in circuitry coupled to the memory, the one or more processors configured to:
  determine delta motion vectors from control point motion vectors of a neighboring block of the current block of video data, wherein to determine the delta motion vectors, the one or more processors are configured to determine a horizontal delta motion vector based on a first control point motion vector of the neighboring block and a second control point motion vector of the neighboring block and determine a vertical delta motion vector based on the first control point motion vector and a third control point motion vector of the neighboring block;

determine delta motion vectors from control point motion vectors of a neighboring block of the current block of video data, the delta motion vectors comprising a horizontal delta motion vector and a vertical delta motion vector;

clip the delta motion vectors to a predefined range; and code the current block of video data using the clipped delta motion vectors.

2. The device of claim 1, wherein the one or more processors are further configured to:
scale the delta motion vectors prior to clipping.

3. The device of claim 2, wherein to scale the delta motion vectors, the one or more processors are further configured to scale the delta motion vectors based on a scaling factor S.

4. The device of claim 3, wherein S is a predefined value or is based on a resolution of a motion vector.

5. The device of claim 4, wherein to scale the delta motion vectors prior to clipping, the one or more processors are configured to:
scale the delta motion vectors based on a width of the neighboring block or a height of the neighboring block.

6. The device of claim 2, wherein to scale the delta motion vectors prior to clipping, the one or more processors are configured to:
scale the delta motion vectors based on a width of the neighboring block or a height of the neighboring block and a scaling factor N.

7. The device of claim 6, wherein N is a function of the width of the neighboring block or the height of the neighboring block, a resolution of a motion vector, or a maximum size of a block.

8. The device of claim 1, wherein the neighboring block is a block other than an above-left neighboring block relative to the current block of video data.

9. The device of claim 1, wherein the neighboring block is an above neighboring block or a left neighboring block.

10. The device of claim 1, further comprising a display configured to display decoded video data.

11. The device of claim 1, wherein the device comprises one or more of a camera, a computer, a mobile device, a broadcast receiver device, or a set-top box.

12. The device of claim 1, wherein the device comprises a video decoder.

13. The device of claim 1, wherein the device comprises a video encoder.

14. The device of claim 1, wherein to code the video data, the one or more processors are configured to encode the video data and the device further comprises:
a camera configured to capture a picture that includes the current block of video data.

15. The device of claim 1, wherein to code the video data, the one or more processors are configured to decode the video data and the device further comprises:
a display configured to display a picture that included the current block of video data.

16. The device of claim 1, wherein the one or more processors are configured to clip the delta motion vectors according to one or more of:

$$\frac{(v_{1x} - v_{0x})}{S}, \frac{(v_{1y} - v_{0y})}{S}, \frac{(v_{2x} - v_{0x})}{S}, \frac{(v_{2y} - v_{0y})}{S},$$

$$\frac{(v_{1x} - v_{0x})}{w}, \frac{(v_{1y} - v_{0y})}{w}, \frac{(v_{2x} - v_{0x})}{h}, \frac{(v_{2y} - v_{0y})}{h}, \text{ or}$$

$$N * \frac{(v_{1x} - v_{0x})}{w}, N * \frac{(v_{1y} - v_{0y})}{w}, N * \frac{(v_{2x} - v_{0x})}{h}, N * \frac{(v_{2y} - v_{0y})}{h}$$

where S is a predefined value or is based on a resolution of a motion vector, w is a width of the neighboring block, h is a height of the neighboring block, and N is one of a maximum size of a block, based on w and h, based on the resolution of the motion vector, or the maximum size of a block divided by an integer constant k.

17. A method of coding video data, the method comprising:
determining delta motion vectors from control point motion vectors of a neighboring block of the current block of video data, wherein determining the delta motion vectors comprises determining a horizontal delta motion vector based on a first control point motion vector of the neighboring block and a second control point motion vector of the neighboring block and determining a vertical delta motion vector based on the first control point motion vector and a third control point motion vector of the neighboring block;

clipping the delta motion vectors to a predefined range; and coding the current block of video data using the clipped delta motion vectors.

18. The method of claim 17, further comprising:
scaling the delta motion vectors prior to clipping.

19. The method of claim 18, wherein scaling the delta motion vectors prior to clipping comprises:
scaling the delta motion vectors based on a scaling factor S.

20. The method of claim 19, wherein S is a predefined value or is based on a resolution of a motion vector.

21. The method of claim 18, wherein scaling the delta motion vectors prior to clipping comprises:
scaling the delta motion vectors based on a width of the neighboring block or a height of the neighboring block.

22. The method of claim 18, wherein scaling the delta motion vectors prior to clipping comprises:
scaling the delta motion vectors based on a width of the neighboring block or a height of the neighboring block and a scaling factor N.

23. The method of claim 22, wherein N is a function of the width of the neighboring block or the height of the neighboring block, a resolution of a motion vector, or a maximum size of a block.

24. The method of claim 17, wherein the neighboring block is a block other than an above-left neighboring block relative to the current block of video data.

25. The method of claim 17, wherein the neighboring block is one of an above neighboring block and a left neighboring block.

26. The method of claim 17, wherein coding the current block of video data comprises encoding the current block of video data, and wherein the method further comprises:
capturing, with a camera, a picture that includes the current block of video data.

27. The method of claim 17, wherein coding the current block of video data comprises decoding the current block of video data, and wherein the method further comprises:
  displaying a picture that includes the decoded current block of video data.

28. The method of claim 17, wherein the clipping the delta motion vectors comprises clipping the delta motion vectors according to one or more of:

$$\frac{(v_{1x} - v_{0x})}{S}, \frac{(v_{1y} - v_{0y})}{S}, \frac{(v_{2x} - v_{0x})}{S}, \frac{(v_{2y} - v_{0y})}{S},$$

$$\frac{(v_{1x} - v_{0x})}{w}, \frac{(v_{1y} - v_{0y})}{w}, \frac{(v_{2x} - v_{0x})}{h}, \frac{(v_{2y} - v_{0y})}{h}, \text{ or}$$

$$N * \frac{(v_{1x} - v_{0x})}{w}, N * \frac{(v_{1y} - v_{0y})}{w}, N * \frac{(v_{2x} - v_{0x})}{h}, N * \frac{(v_{2y} - v_{0y})}{h}$$

where S is a predefined value or is based on a resolution of a motion vector, w is a width of the neighboring block, h is a height of the neighboring block, and N is one of a maximum size of a block, based on w and h, based on the resolution of the motion vector, or the maximum size of a block divided by an integer constant k.

29. A device for coding video data, the device comprising:
  means for determining delta motion vectors from control point motion vectors of a neighboring block of a current block of video data, wherein the means for determining the delta motion vectors comprises means for determining a horizontal delta motion vector based on a first control point motion vector of the neighboring block and a second control point motion vector of the neighboring block and means for determining a vertical delta motion vector based on the first control point motion vector and a third control point motion vector of the neighboring block;
  the delta motion vectors comprising a horizontal delta motion vector and a vertical delta motion vector;
  means for clipping the delta motion vectors to a predefined range; and
  means for coding the current block of video data using the clipped delta motion vectors.

30. The device of claim 29, further comprising:
  means for scaling the delta motion vectors prior to clipping.

31. A non-transitory computer-readable storage medium having stored thereon instructions that, when executed, cause one or more processors to:
  determine delta motion vectors from control point motion vectors of a neighboring block of the current block of video data, wherein to determine the delta motion vectors, the instructions cause the one or more processors to determine a horizontal delta motion vector based on a first control point motion vector of the neighboring block and a second control point motion vector of the neighboring block and determine a vertical delta motion vector based on the first control point motion vector and a third control point motion vector of the neighboring block;
  clip the delta motion vectors to a predefined range; and
  code the current block of video data using the clipped delta motion vectors.

* * * * *